(12) United States Patent
Shoji et al.

(10) Patent No.: US 9,379,839 B2
(45) Date of Patent: Jun. 28, 2016

(54) OPTICAL TRANSMISSION DEVICE AND OPTICAL TRANSMISSION METHOD

(75) Inventors: Takuma Shoji, Yokohama (JP); Ichiro Nakajima, Koto (JP)

(73) Assignee: FUJITSU LIMITED, Kawasaki (JP)

( * ) Notice: Subject to any disclaimer, the term of this patent is extended or adjusted under 35 U.S.C. 154(b) by 379 days.

(21) Appl. No.: 13/557,279

(22) Filed: Jul. 25, 2012

(65) Prior Publication Data

US 2013/0034353 A1 Feb. 7, 2013

(30) Foreign Application Priority Data

Aug. 2, 2011 (JP) ................ 2011-169648

(51) Int. Cl.
| | |
|---|---|
| *H04J 14/00* | (2006.01) |
| *G02B 5/08* | (2006.01) |
| *G02B 5/10* | (2006.01) |
| *H04J 14/02* | (2006.01) |

(52) U.S. Cl.
CPC ......... *H04J 14/0212* (2013.01); *H04J 14/0213* (2013.01)

(58) Field of Classification Search
USPC .................................. 359/838–854
See application file for complete search history.

(56) References Cited

U.S. PATENT DOCUMENTS

| | | | | |
|---|---|---|---|---|
| 6,366,716 B1* | 4/2002 | Graves | ............... | H04Q 11/0005 359/341.1 |
| 7,103,258 B2* | 9/2006 | Katsunuma | ........ | G02B 6/29311 385/140 |
| 8,331,744 B2* | 12/2012 | Furukawa | .............. | G02B 6/356 359/320 |
| 2002/0122617 A1* | 9/2002 | Nakajima | .......... | H04Q 11/0005 385/16 |
| 2002/0191901 A1* | 12/2002 | Jensen | ................. | G02B 6/3588 385/24 |
| 2004/0130774 A1* | 7/2004 | Giles | ....................... | H04J 14/02 359/290 |
| 2005/0074204 A1* | 4/2005 | Wilson | ................. | G02B 6/2931 385/24 |
| 2005/0180689 A1* | 8/2005 | Kozhevnikov | ..... | G02B 6/29367 385/33 |
| 2005/0213978 A1* | 9/2005 | Yamashita | .......... | H04J 14/0212 398/79 |
| 2006/0198583 A1* | 9/2006 | Oikawa | .............. | H04Q 11/0005 385/53 |
| 2006/0203329 A1* | 9/2006 | Nishihara | ........... | H01S 3/06754 359/337 |

(Continued)

FOREIGN PATENT DOCUMENTS

| | | |
|---|---|---|
| JP | 2005-283932 | 10/2005 |
| JP | 2006-243571 | 9/2006 |
| WO | 2010/019885 | 2/2010 |

OTHER PUBLICATIONS

Japanese Office Action dated Jun. 2, 2015 in corresponding Japanese Patent Application No. 2011-169648, 4 pages.

*Primary Examiner* — David Payne
*Assistant Examiner* — Pranesh Barua
(74) *Attorney, Agent, or Firm* — Staas & Halsey LLP

(57) ABSTRACT

An optical transmission device includes: a spectral element configured to disperse an incident light beam in a first direction according to a wavelength of the incident light beam; a mirror array configured by a plurality of mirrors, each mirror having a reflective surface in which a reflection angle is adjustable and to which the incident light beam dispersed in the first direction is incident, the reflective surface being arranged on a plane formed by the first direction and a second direction orthogonal to the first direction; a plurality of ports arranged in the second direction; and a controller configured to adjust the reflection angle, so that a light beam reflected at the reflective surface is outputted to the port according to a region segmented in the second direction in the mirror array, the dispersed incident light beam that has a specified wavelength band being incident to the reflective surface.

1 Claim, 19 Drawing Sheets

(56) References Cited

U.S. PATENT DOCUMENTS

| | | | |
|---|---|---|---|
| 2006/0219879 A1* | 10/2006 | Katou | G02B 6/3582 250/227.21 |
| 2006/0222290 A1* | 10/2006 | Yamashita | G02B 6/3586 385/18 |
| 2007/0166034 A1* | 7/2007 | Tremaine | G02B 6/356 398/45 |
| 2008/0239441 A1* | 10/2008 | Aota | G02B 6/29311 359/212.1 |
| 2008/0316479 A1* | 12/2008 | Suzuki | G02B 6/12019 356/300 |
| 2008/0317405 A1* | 12/2008 | Aota | G02B 5/3083 385/18 |
| 2009/0052839 A1* | 2/2009 | Shimizu | G02B 6/29311 385/18 |
| 2009/0290223 A1* | 11/2009 | Aota | G02B 6/29311 359/641 |
| 2009/0304328 A1* | 12/2009 | Presley | G02B 6/29311 385/16 |
| 2010/0021167 A1* | 1/2010 | Aota | G02B 6/29311 398/79 |
| 2010/0046944 A1* | 2/2010 | Wagener | H04J 14/02 398/34 |
| 2010/0098418 A1* | 4/2010 | Bouet | H04B 10/2503 398/58 |
| 2010/0150563 A1* | 6/2010 | Nakajima | H04B 10/07955 398/81 |
| 2011/0292482 A1* | 12/2011 | Matsumoto | G02B 6/356 359/223.1 |
| 2012/0057869 A1* | 3/2012 | Colbourne | H04J 14/0213 398/49 |
| 2012/0128355 A1* | 5/2012 | Sakurai | G02B 6/356 398/48 |
| 2012/0170930 A1* | 7/2012 | Komiya | G02B 6/3546 398/34 |

* cited by examiner

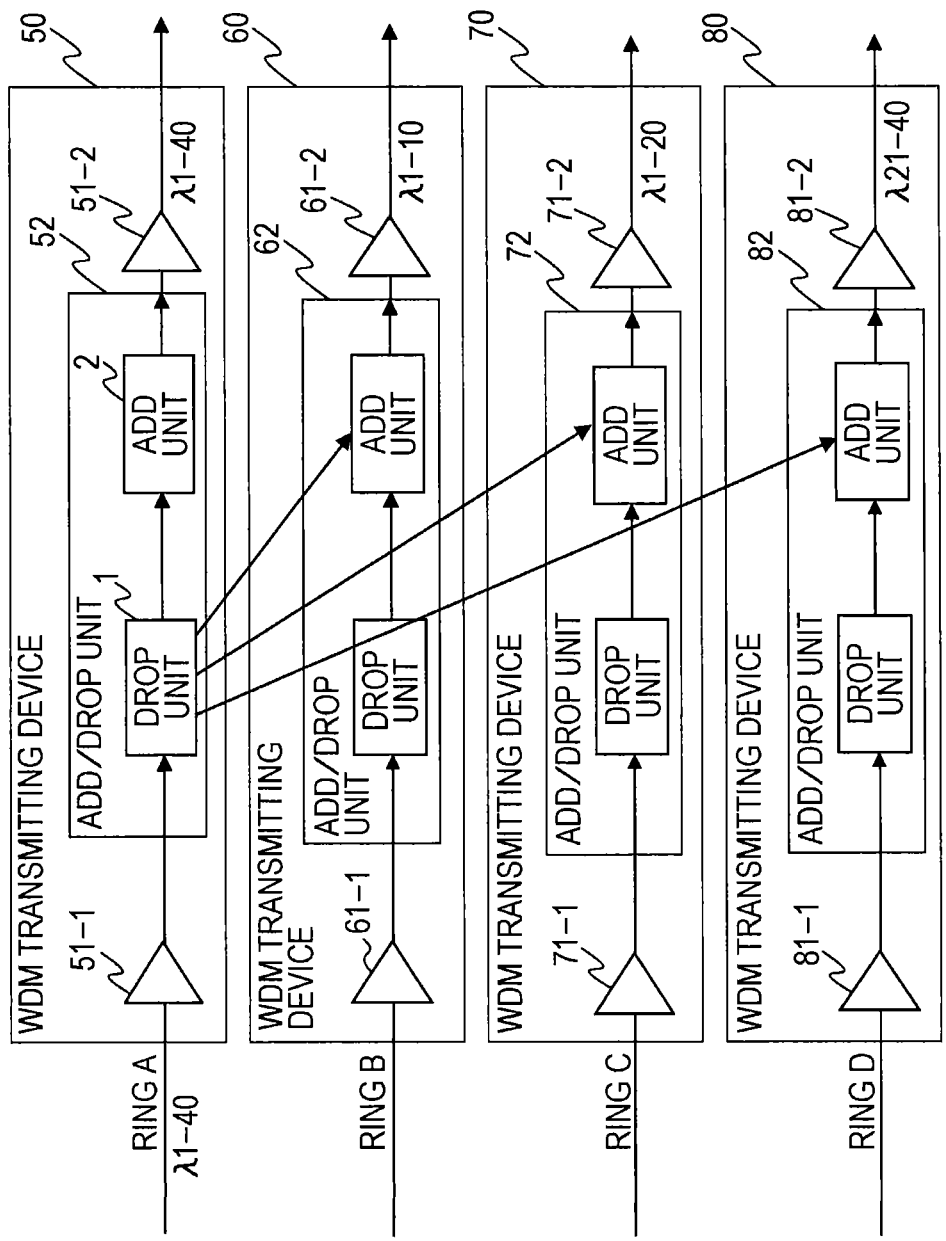

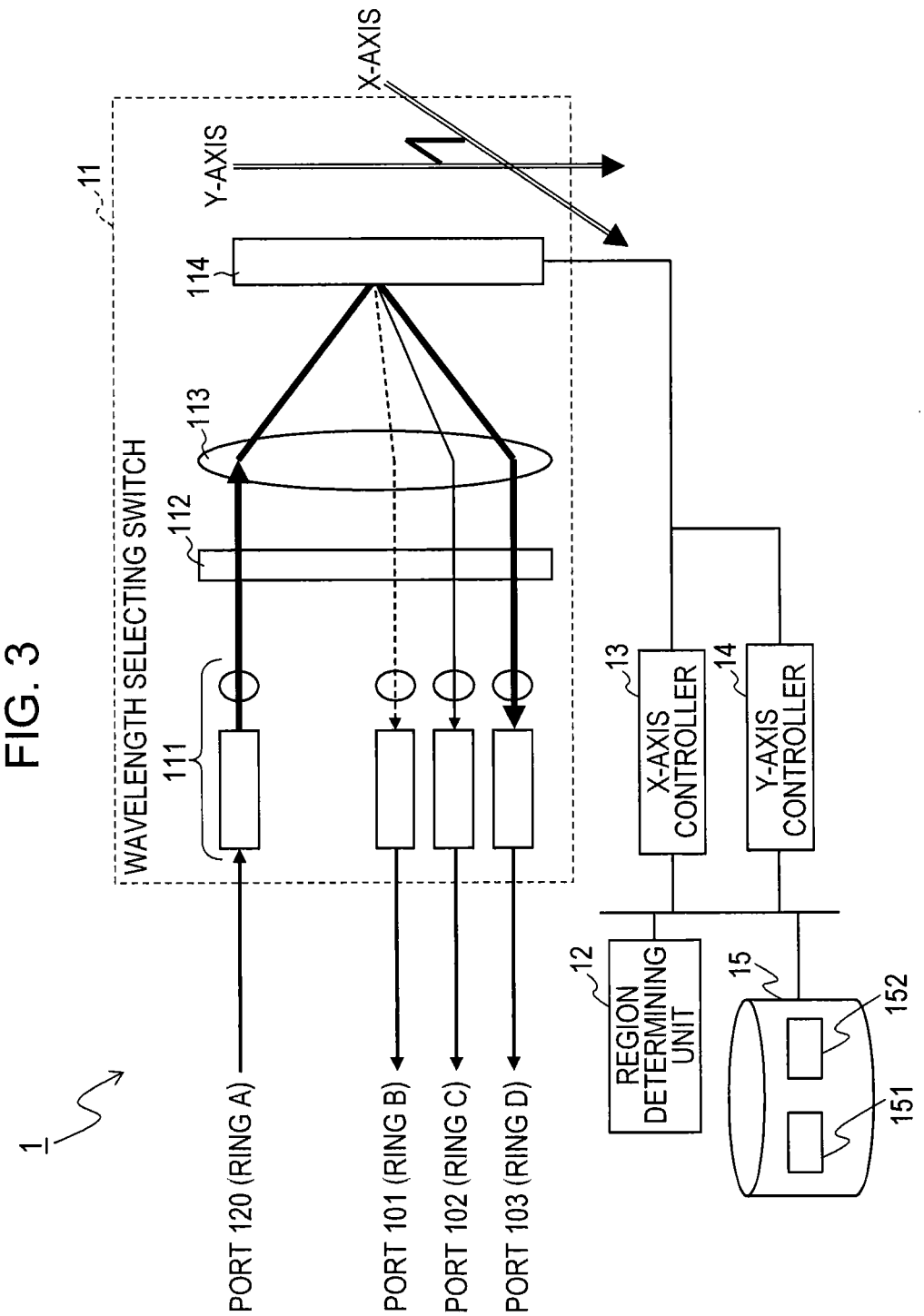

FIG. 5

| SIGNAL SPEED | MODULATION SYSTEM | MODULATION SPEED | DESIRED NUMBER OF MIRRORS (X-AXIS DIRECTION) |
|---|---|---|---|
| 2.4 G | NRZ | 2.4 G | 10 |
| 10 G | NRZ | 10 G | 10 |
| 40 G | DP-QPSK | 10 G | 15 |
| 40 G | DQPSK | 20 G | 30 |
| 100 G | DP-QPSK | 25 G | 40 |
| ⋮ | ⋮ | ⋮ | ⋮ |

FIG. 6

| NUMBER OF SEGMENTS IN Y-AXIS DIRECTION | ASSIGNMENT MIRROR RATE (Y-AXIS) |
|---|---|
| 2 | 100<br>100 |
| 3 | 80<br>40<br>80 |
| ⋮ | ⋮ |

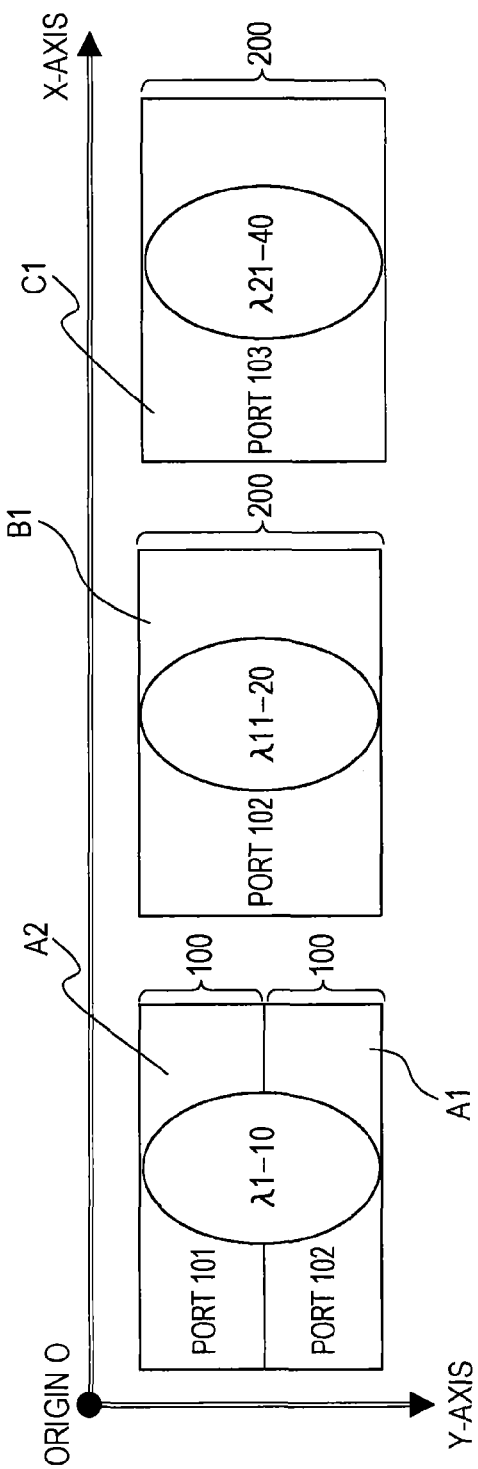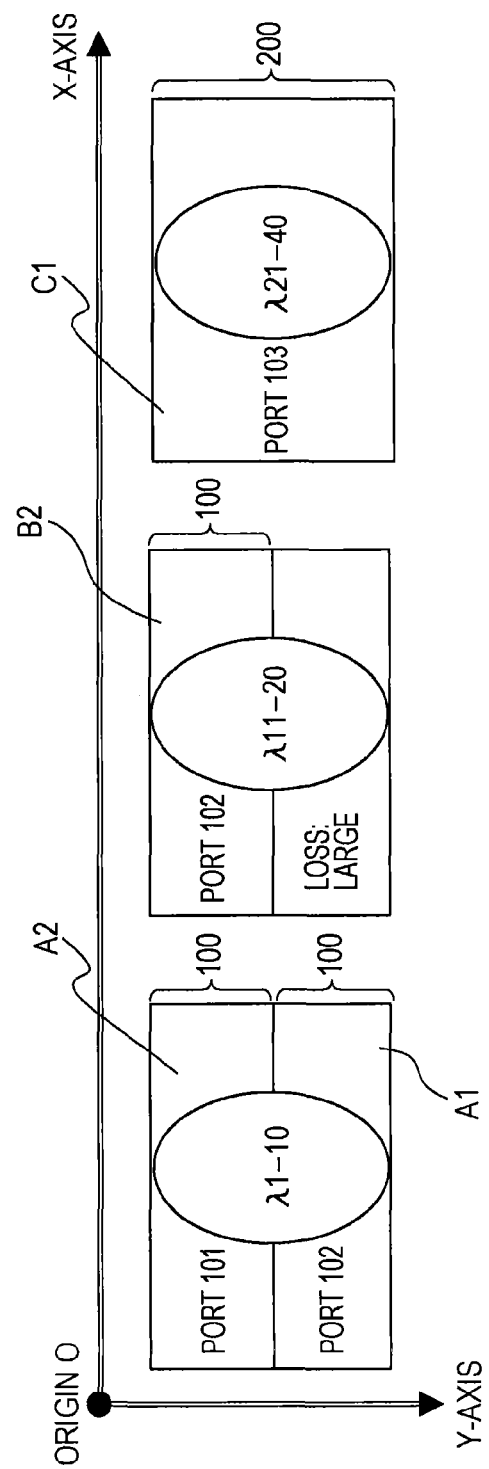
FIG. 10A
FIG. 10B

FIG. 12

| NUMBER OF CHANNEL TRANSMISSION DESTINATIONS | UPPER LIMIT THRESHOLD [dBm] | LOWER LIMIT THRESHOLD [dBm] |
|---|---|---|
| 1 | −8.1 | 2.5 |
| 2 | −10.0 | 2.2 |
| ⋮ | ⋮ | ⋮ |

FIG. 13
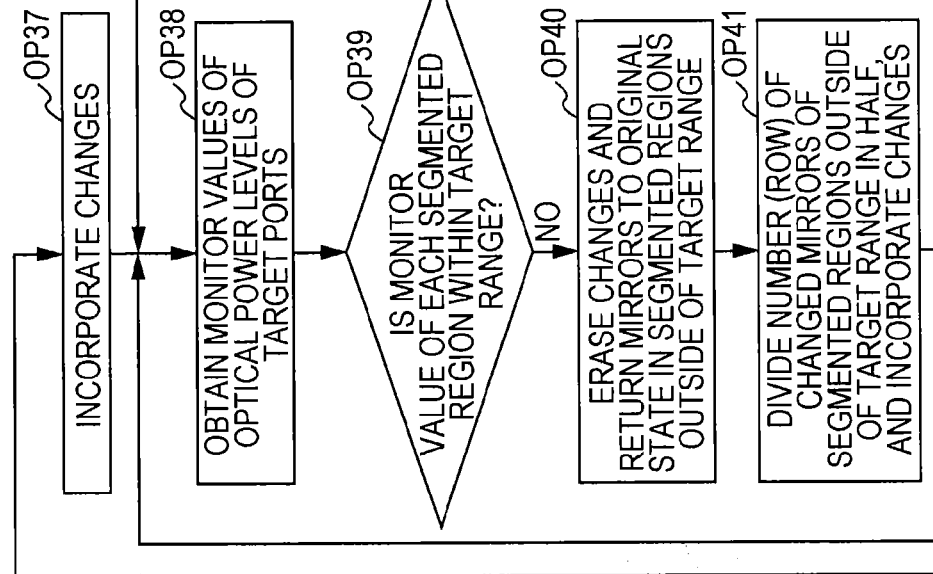
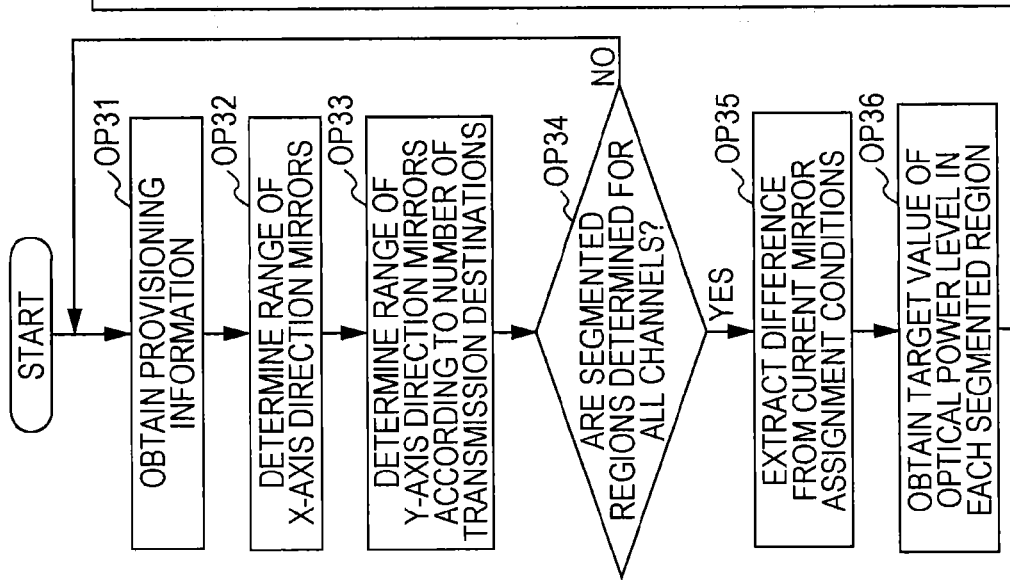

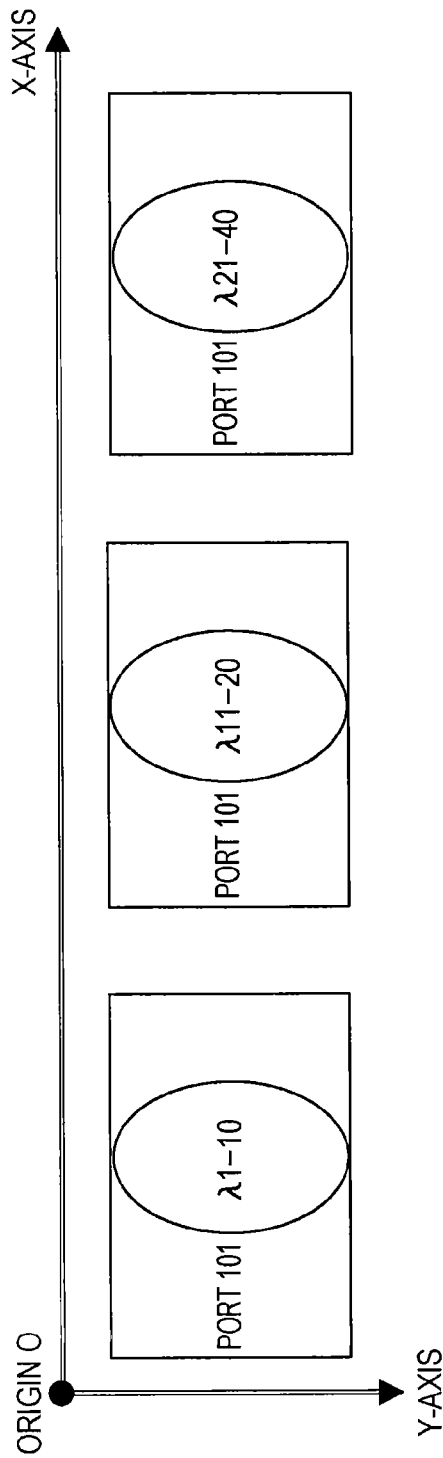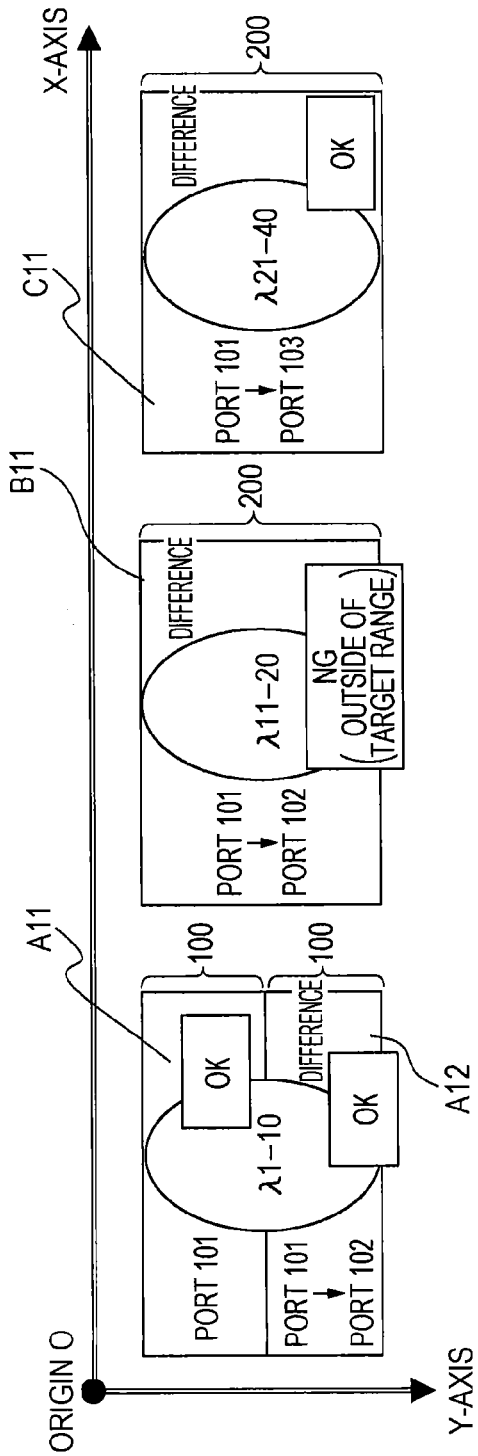
FIG. 14A
FIG. 14B

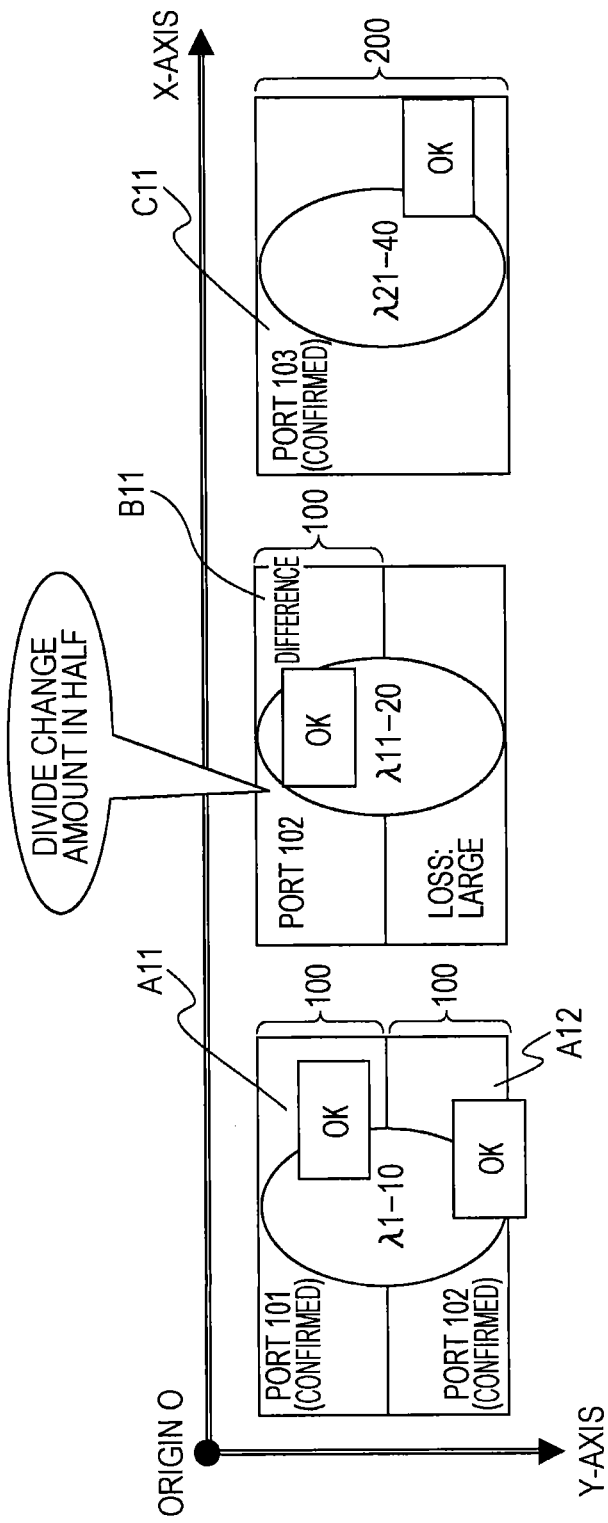

FIG. 16

| NUMBER OF OUTPUT PORTS | AMPLIFICATION LEVEL INCREASES [dB] |
|---|---|
| 2 | 1.0 |
| 3 | 1.2 |
| 4 | 1.5 |
| ⋮ | ⋮ |

OPTICAL TRANSMISSION DEVICE AND OPTICAL TRANSMISSION METHOD

CROSS-REFERENCE TO RELATED APPLICATION

This application is based upon and claims the benefit of priority of the prior Japanese Patent Application No. 2011-169648, filed on Aug. 2, 2011, the entire contents of which are incorporated herein by reference.

FIELD

The embodiments discussed herein are related to an optical transmission device that disperses optical signals to a plurality of transmission destinations and an optical transmission method.

BACKGROUND

Japanese Laid-open Patent Publication Nos. 2006-243571 and No. 2005-283932 discuss optical switches used, for example, in wavelength division multiplexing (WDM) ring network connections. The optical switch is an optical device for switching light paths among optical transmission paths, and connects a plurality of WDM ring networks by connecting the WDM ring networks, for example, to physical ports. The optical switch divides received optical signals into a plurality of signals each have different wavelength bands included in the received optical signals, and outputs the divided optical signals to transmission destinations according to the respective wavelengths. When the optical signals are distributed by the optical switch, either the received optical signals (or the optical signals distributed into respective wavelength bands) are outputted from all the output ports (connected WDM ring networks), or the received optical signals (or the optical signals distributed into respective wavelength bands) are outputted from one output port. Hereinbelow, outputting the received optical signals from all the output ports will be referred to as "broadcasting" in the embodiments described herein. Conversely, outputting the received optical signals from one of the output ports will be referred to as "unicasting" in the embodiments described herein. Ring networks are simply referred to as rings in the drawings and in the specification below.

FIG. 18 illustrates an example of optical signal broadcasting with the optical switch to connect a plurality of WDM rings. In the example illustrated in FIG. 18, an optical switch P1 is connected to a ring A, a ring B, a ring C, and a ring D. The optical switch P1 is equipped with an optical coupler (represented as "CPL" in FIG. 18). The received optical signals are transmitted in the form of the original signals to a plurality of transmission destinations. The optical switch P1 in FIG. 18 receives, from the ring A, optical signals including 40 types of wavelengths from wavelength $\lambda 1$ to wavelength $\lambda 40$ (hereinbelow, wavelengths $\lambda 1$-40). The optical switch P1 transmits the optical signals including the same wavelengths $\lambda 1$-40 as the received optical signals to all the rings (ring B, ring C, ring D) except for the ring A. It is to be noted that the wavelengths $\lambda 1$-40 depicted in FIG. 18 are provided with numbers to conveniently identify different wavelengths, and thus the numbers do not represent wavelength bands. Moreover, the wavelengths $\lambda 1$-40 are numbered in order from the smallest wavelength. However, the number of the types of wavelengths is not limited to the 40 types illustrated in FIG. 18.

However, the following problem may occur, for example, if the ring B, ring C, and ring D in FIG. 18 are used by different clients. If the clients that use the rings are different, transmitting the optical signals received from the ring A by broadcasting to the ring B, the ring C, and the ring D involves difficulties with security aspects for the clients. As a result, it is desirable to avoid duplicating the wavelengths of the optical signals transmitted to the ring B, the ring C, and the ring D if each of the clients using the rings are different.

FIG. 19 illustrates an example of optical signal unicasting with an optical switch to connect a plurality of WDM rings. In the example illustrated in FIG. 19, an optical switch P2 is connected to the ring A, the ring B, the ring C, and the ring D as similarly illustrated in FIG. 18. The optical switch P2 is equipped with a wavelength select switch (WSS) and is able to transmit arbitrary wavelengths to a plurality of transmission destinations. In FIG. 19, the optical switch P2 receives optical signals including the wavelengths $\lambda 1$-40 from the ring A and transmits wavelengths $\lambda 1$-10 to the ring B, wavelengths $\lambda 11$-15 and 20 to the ring C, and wavelengths $\lambda 16$-19, and 21-40 to the ring D, from among the received wavelengths. As illustrated in FIG. 19 when transmitting by unicasting, security problems do not arise even when different clients use the ring B, the ring C, and the ring D since the wavelengths of the optical signals transmitted to the ring B, the ring C, and the ring D are not duplicated.

For example, the optical signals with wavelengths $\lambda 1$-10 may be transmitted to the ring B and the ring C, but not to the ring D. Transmitting the same optical signals to at least two rings among a plurality of rings connected to the optical switch is referred to as "multicasting" hereinafter. However, the multicasting of optical signals suffers from the following problem.

FIG. 20 illustrates a configuration example when the optical signals with wavelengths $\lambda 1$-10 are transmitted to the ring B and the ring C in the optical network illustrated in FIG. 19. In the example illustrated in FIG. 20, an optical switch P3 that includes a WSS on the ring A is added as a method, for example, for transmitting the optical signals with wavelengths $\lambda 1$-10 to the ring B and the ring C. The optical signals with the wavelengths $\lambda 1$-10 are transmitted to the ring B and the ring C due to the added optical switch P3 transmitting the optical signals with the wavelengths $\lambda 1$-10 to the ring C.

FIG. 21 illustrates a configuration example when the optical signals with wavelengths $\lambda 1$-10 are transmitted to the ring B and the ring C in the optical network illustrated in FIG. 19. In the example illustrated in FIG. 21, an optical switch P4 that includes a WSS on the ring B is added as a method, for example, such that the optical signals with wavelengths $\lambda 1$-10 are transmitted to the ring B and the ring C. The optical signals with the wavelengths $\lambda 1$-10 reach the ring C due to the added optical switch P4 transmitting the received optical signals with the wavelengths $\lambda 1$-10 from the ring B to the ring C.

According to either of the methods illustrated in FIG. 20 and FIG. 21, a new optical switch is added and thus there is an increase in the mounting spaces (shelving, units, etc.) for the newly added nodes, in the number of optical fibers for connections, and in the number of setting commands. This leads to increases in initial expenses, operating costs, management costs and the like. Moreover, the network design becomes more complicated.

As illustrated in the example in FIG. 21, a delay may be caused when transmitting the signals with the wavelengths $\lambda 1$-10 to the ring C by adding the switch P4 equipped with the WSS on the ring B in comparison to transmitting the same optical signals directly from the ring A to the ring C. Although the above explanation uses the example of a ring network, a similar problem arises on other networks such as a linear network.

SUMMARY

According to an aspect of the embodiment, there is provided an optical transmission device including: a spectral element configured to disperse an incident light beam in a first direction according to a wavelength of the incident light beam; a mirror array configured by a plurality of mirrors, each mirror having a reflective surface in which a reflection angle is adjustable and to which the incident light beam dispersed in the first direction is incident, the reflective surface being arranged on a plane formed by the first direction and a second direction orthogonal to the first direction; a plurality of ports arranged in the second direction; and a controller configured to adjust the reflection angle, so that a light beam reflected at the reflective surface is outputted to the port according to a region segmented in the second direction in the mirror array, the dispersed incident light beam that has a specified wavelength band being incident to the reflective surface.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is an example of a schematic configuration of a WDM transmission device;

FIG. 3 is an example of a configuration of drop unit of a WDM transmission device;

FIG. 5 is an example of X-axis assignment information;

FIG. 6 is an example of Y-axis assignment information;

FIG. 10A is an example of temporarily determined mirror assignments for channels of wavelengths λ1-40 at the point of time when the processing in OP13 of FIG. 9 is completed;

FIG. 10B is an example of a finally determined mirror assignments for channels of wavelengths λ1-40 at the point of time when the processing in OP17 of FIG. 9 is completed;

FIG. 12 is an example of optical power level limit information recorded in a database;

FIG. 13 is a flow chart of mirror control processing of a mirror array according to the third embodiment;

FIG. 14A is an example of initial settings of mirror assignments of a mirror array;

FIG. 14B is an example of temporarily determined mirror assignments for channels of the wavelengths λ1-40 at the point of time when the processing in OP33 of FIG. 13 is completed;

FIG. 14C is an example of a mirror assignment for the channels of the wavelengths λ1-40 when the change amount of a segmented region is halved when the reflected light optical power level is outside of the target range;

FIG. 16 is an example of amplification level change information recorded in a database;

DESCRIPTION OF EMBODIMENTS

Embodiments described hereinbelow will be explained with reference to the drawings. Configurations of the embodiments are merely examples and are not limited to such configurations.

First Embodiment

Figure 1:
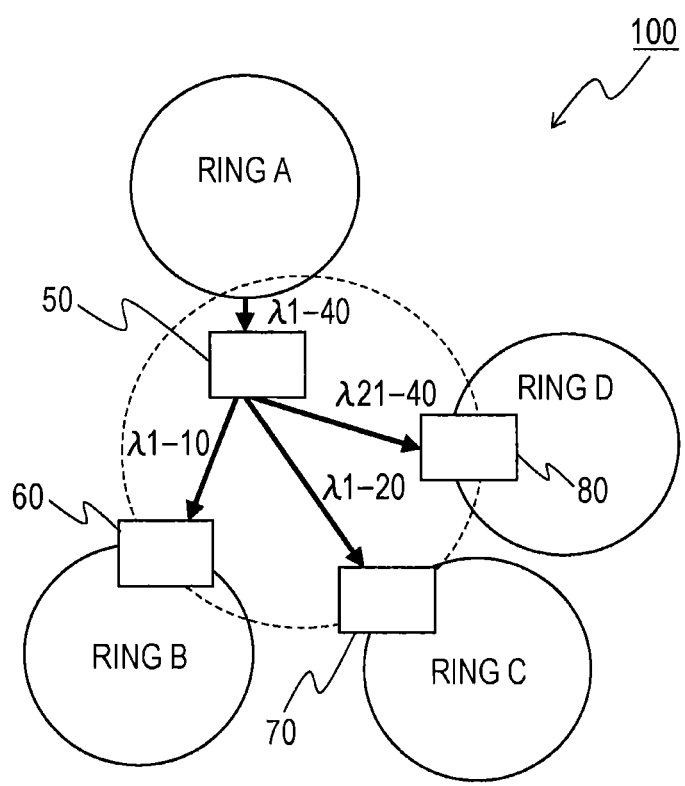
FIG. 1 is an example of an optical network design according to a first embodiment.

FIG. 1 is an example of an optical network design according to a first embodiment. An optical network 100 includes a ring A, a ring B, a ring C, and a ring D that are WDM rings. The ring A is connected to a WDM transmission device 50. The ring B is connected to a WDM transmission device 60. The ring C is connected to a WDM transmission device 70. The ring D is connected to a WDM transmission device 80. The WDM transmission device 50 on the ring A is connected to the rings B, C, and D. Specifically, the WDM transmission device 50 is connected to the WDM transmission device 60, the WDM transmission device 70, and the WDM transmission device 80.

The optical network 100 illustrated in FIG. 1 is configured such that optical signals including channels of wavelengths λ1-40 are inputted from the ring A into the WDM transmission device 50, channels of wavelengths λ1-10 are transmitted to the ring B (WDM transmission device 60), channels of wavelengths λ1-20 are transmitted to the ring C (WDM transmission device 70), and channels of wavelengths λ21-40 are transmitted to the ring D. Specifically, the channels of wavelengths λ1-10 are transmitted by multicasting to the rings B and C by the WDM transmission device 50 in the optical network 100.

FIG. 2 is an example of a schematic configuration of a WDM transmission device. The WDM transmission device 50 includes an add/drop unit 52, an optical amplifier 51-1, and an optical amplifier 51-2. The add/drop unit 52 may be a single, independent device connected to a network, or may be a slot card mounted in a slot of a communication device. A preliminary stage of the add/drop unit 52 is connected to the optical amplifier 51-1. A subsequent stage of the add/drop unit 52 is connected to the optical amplifier 51-2. This configuration is used to address attenuation due to the transmission of the optical signals. The add/drop unit 52 includes a drop unit 1 and an add unit 2. The optical amplifiers 51-1 and 51-2 may be provided or may not be provided in the embodiments discussed herein.

The drop unit 1 branches received optical signals into channels and transmits optical signals to another ring (WDM transmission device). The drop unit 1 is, for example, an electronic circuit that includes a Wavelength Select Switch (WSS) and a control circuit to control the WSS.

The add unit 2 inserts channels received from another ring into optical signals transmitted on the ring A. The add unit 2 is, for example, an electronic circuit that includes a WSS and a control circuit to control the WSS.

Although not illustrated in FIG. 2, the WDM transmission device 50 is equipped with a plurality of input ports and a plurality of output ports and the like in addition to the drop unit 1 and the add unit 2.

The WDM transmission device 60, the WDM transmission device 70, and the WDM transmission device 80 each have a drop unit, an add unit, and an optical coupler similar to the WDM transmission device 50. However, the drop unit and the add unit are not limited to WSS units and may each be an element, or a combination of elements, that is able to add or drop optical signals.

FIG. 3 is an example of a configuration of the drop unit 1 of the WDM transmission device 50 in FIG. 2. The drop unit 1 of the WDM transmission device 50 includes a WSS 11, a region determining unit 12, an X-axis controller 13, a Y-axis controller 14, and a database 15. In this and the following embodiments, the region determining unit 12, the X-axis controller 13, and the Y-axis controller 14 are configured, for example, by using at least one of a circuit, a Field-Programmable Gate Array (FPGA), or a processor.

The WSS 11 includes an input/output optical system 111 (an input optical system and an output optical system) having an input/output port and a collimator and the like, a diffraction grating 112, a lens 113, and a mirror array 114. The diffraction grating 112 is a spectral element for dispersing wavelength-multiplexed optical signals into respective channels. The optical signals dispersed by the diffraction grating 112 are distributed to the respective channels in different directions. According to the first embodiment, the direction (optical band direction) in which the optical signals dispersed by the diffraction grating 112 are distributed to the respective channels is determined by the X-axis. The X-axis is an example of a first direction in the embodiments.

The mirror array 114 includes a plurality of mirrors arranged in a rectangular shape. The mirror array 114 may be, for example, a liquid crystal silicon (LCOS) mirror array, a digital light processing (DLP) mirror array, or a micro electro mechanical systems (MEMS) mirror array. One side of the rectangular mirror array 114 corresponds to the direction for distributing the optical signals dispersed by the diffraction grating 112 and determined by the X-axis. In the embodiments described herein, a direction orthogonal to the side corresponding to the X-axis of the mirror array 114 is determined as the Y-axis. The Y-axis is an example of a second direction in the embodiments. Rotation angles of each of the mirrors included in the mirror array 114 may be adjusted based on the X-axis as the rotational axis. Specifically, reflection angles of the mirrors in the mirror array 114 may be controlled with respect to an incident direction of the input optical signals within a plane orthogonal to the X-axis. Therefore, the mirror array 114 controls the reflecting direction of the optical signals within the plane perpendicular to the X-axis by controlling the reflection angle of each mirror. Regions in which the mirrors in the mirror array 114 reflect the input optical signals are hereinafter referred to as mirror regions. The mirror regions may be segmented by units of mirror and thus segmented mirror regions are hereinafter referred to as segmented regions.

The arrangement direction of the input/output optical system 111 corresponds to the Y-axis. Herein, a system in the input/output optical system 111 which inputs the input optical signals into the mirror array 114 will be referred to as an input optical system 111a, and a system in the input/output optical system 111 which outputs reflected signals with reflected light reflected by the mirror array 114 will be referred to as an output optical system 111b. The output optical system 111b is arranged to be able to receive reflected signals whose respective angles are controlled by the mirror array 114 within the plane orthogonal to the X-axis. An input port 120, output ports 101, 102, and 103, and the input optical system 111a and the output optical system 111b connected to the respective ports are depicted in FIG. 3. The input port 120 is connected to the ring A. The output port 101 is connected to the ring B. The output port 102 is connected to the ring C. The output port 103 is connected to the ring D. The input optical system 111a of the WSS 11 represents one input port and is connected to the ring A. The output optical system 111b of the WSS 11 is represented by the output port 101 connected to the ring B, the output port 102 connected to the ring C, and the output port 103 connected to the ring D. Specifically, the output optical system 111b of the drop unit 1 in a WDM transmission device corresponds to an output port outside of the output port connected to the ring belonging to the host device. If the number of output ports provided in the WDM transmission device is n, the number of ports of the output optical system 111b is n−1 ports. Hereinbelow, the designation "output port" simply refers to the output optical system 111b. When distinguishing an "output port" as the output optical system 111b, a reference numeral of the output port connected to the output optical system 111b will be used. For example, the indication "output port 101" refers to the connection of the output port 101 to the output optical system 111b.

The input optical signals input from the input port 120 pass through the input optical system 111a, enter the diffraction grating 112, and are dispersed to the channels in the X-axis direction. The optical signals dispersed into the channels by the diffraction grating 112 are refracted by the lens 113 and enter the mirror array 114. The optical signals may be sorted into any one of the output ports for each channel by changing the rotation angles of the mirrors in the mirror array 114 based on the X-axis as the rotational axis.

Figure 4A:
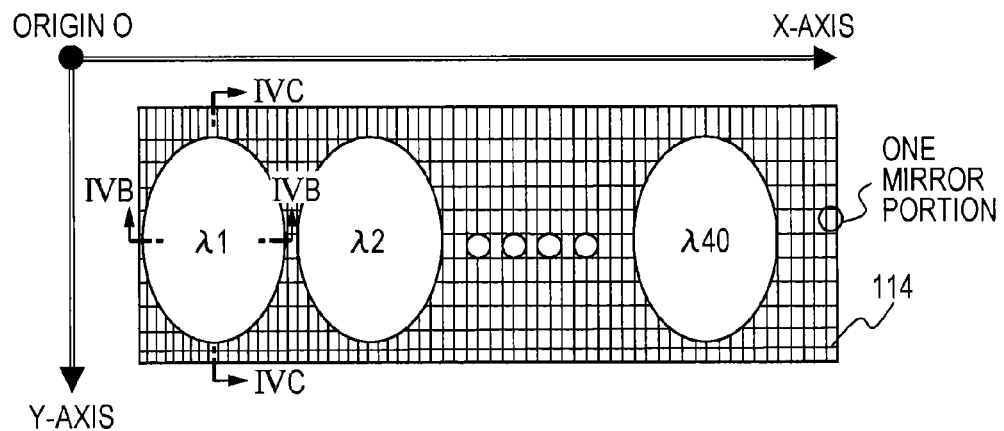
FIG. 4A is an example of an incidence range of optical signals dispersed to channels of wavelengths λ1-40 incident upon a mirror array.

FIG. 4A is an example of an incidence range of optical signals dispersed to channels of wavelengths λ1-40 incident upon the mirror array 114. FIG. 4A illustrates the reflective surface of the mirror array 114, or in other words, the mirror array 114 as seen from the incident direction of the optical signals. One rectangle depicted in FIG. 4A represents one mirror included in the mirror array 114. The oval lines encircling the wavelengths λ1-40 in FIG. 4A represent incidence ranges of the optical signals of the respective wavelengths λ1-40. Although the reflective surface is illustrated as a flat surface in FIG. 4A for convenience, each mirror is actually tilted at a certain angle with respect to the X and Y planes around the Y-axis as the rotational axis such that the reflected light beams of the channels of any of the wavelengths λ1-40 are incident upon the output ports. The angles of the mirrors with respect to the X and Y planes based on the X-axis as the rotational axis are controlled such that the output ports become the transmission destinations of the assigned channels.

The top left of the reflective surface of the mirror array 114 illustrated in FIG. 4A is the origin 0. The horizontal direction is the X-axis and the vertical direction is the Y-axis in FIG. 4A. The direction going to the right from the origin 0 is the positive direction on the X-axis. The direction going downward from the origin 0 is the positive direction on the Y-axis.

Input light beam dispersed by the diffraction grating 112 is dispersed in order from the channel with the smallest wavelength along the X-axis. As a result, intensity distribution of the optical signals of each channel of the wavelengths $\lambda1\text{-}40$ depicted in FIG. 4A is portrayed in the positive X-axis direction from the wavelength $\lambda1$. The spread in the frequency spectrum of the optical signals is produced by the generation of side bands and noise and the like due to modulation. As a result, the intensity distribution of the optical signals dispersed in the channels as illustrated in FIG. 4A also includes a spread in the X-axis direction. The spread of the intensity distribution in the X-axis direction of the channels depends upon the modulation system and modulation speed and the like of the optical signals.

Figure 4B:
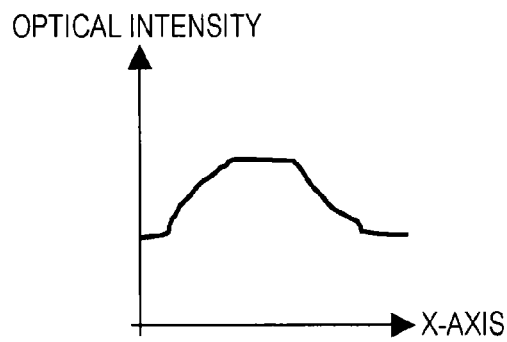
FIG. 4B is an example of a cross-section of signal power of a line IVB-IVB parallel to the X-axis on FIG. 4A.
Figure 4C:
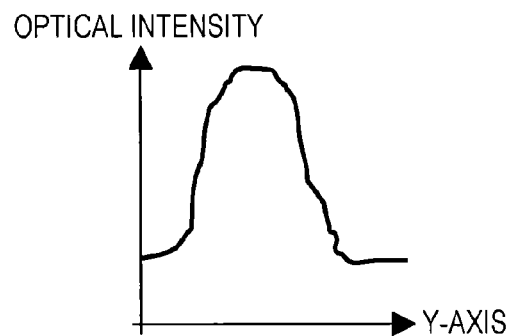
FIG. 4C is an example of a cross-section of signal power of a line IVC-IVC parallel to the Y-axis on FIG. 4A.

FIG. 4B is an example of a cross-section of signal intensity of the line IVB parallel to the X-axis on FIG. 4A. FIG. 4C is an example of a cross-section of signal intensity of the line IVC parallel to the Y-axis on FIG. 4A. As illustrated in FIG. 4B, the intensity of the optical signals indicates a spread of the intensity distribution in the X-axis direction near the center, or in other words, the intensity distribution is stronger near the carrier wave spectrum. As illustrated in FIG. 4C, the intensity of the optical signals is stronger near the center of the intensity distribution in the Y-axis direction.

The region determining unit 12 (referring to FIG. 3) assigns a segmented region for each combination of a channel included in the input light beam and a transmission destination. As illustrated in FIG. 4A, the ranges of the segmented regions in the X-axis direction are determined by the channel to which each segmented region is assigned since the optical signals of the channels included in the input light beam are dispersed in the X-axis direction. Moreover, the ranges of the segmented regions in the Y-axis direction are determined by the transmission destination to which that segmented region is assigned. The ranges of the segmented regions in the X-axis direction and Y-axis direction are defined by the number of assigned mirrors and the positions of the mirrors in the mirror regions. For example, if the mirrors included in the mirror array 114 are represented as X and Y coordinates, a segmented region range is defined as $(X1\pm\Delta X, Y1\pm\Delta Y)$ where the datum point is the coordinate $(X1, Y1)$, and the number of mirrors in the X-axis direction from the datum point is $\Delta X$, and the number of mirrors in the Y-axis direction from the datum point is $\Delta Y$. For example, the segmented region range may be defined as $(X2, Y2)$ to $(X3, Y3)$ where the starting point is the coordinate $(X2, Y2)$ and the terminating point is the coordinate $(X3, Y3)$. For example, when each mirror in the mirror array 114 is sorted by an identification number, the segmented region range may be also defined by enumerating all the identification numbers of the mirrors included in that segmented region.

The region determining unit 12 determines the number of mirrors in the X-axis direction of the segmented regions such that all the wavelength bands of the channels may be encompassed (not divided). Specifically, the region determining unit 12 refers to belowmentioned X-axis assignment information 151 recorded in the database 15 to determine the number of mirrors in the X-axis direction of the segmented region of each channel according to the signal speed, the modulation system, and the like. The region determining unit 12 also arranges the segmented regions in order from the origin 0 starting with the channel with the smallest wavelength in the X-axis direction illustrated in FIG. 4A such that the segmented regions do not overlap between channels. Alternatively, the region determining unit 12 may determine the range of the segmented regions in the X-axis direction such that a center point is positioned in the center if the center point position (X-axis coordinate) of the incident range of the optical signals of the wavelengths $\lambda1\text{-}40$ channels in the mirror array 114 is known ahead of time.

The modulation system, signal speed and the like of the optical signals of each channel is obtained from provisioning information. The provisioning information is information related to a network structure used by monitoring software of the WDM transmission devices that manage the configuration of the optical network 100. The provisioning information includes information related to modulation systems of the optical signals of each channel, signal speeds, and transmission routes of the optical signals of each channel.

In the first embodiment, the region determining unit 12 sets the number (number of segments in the Y-axis direction) of segmented regions included in the Y-axis direction of the mirror region to the same number as the number of output ports, and assigns a segmented region to each output port. The region determining unit 12 obtains the number of mirrors in the Y-axis direction in each segmented region arranged in the Y-axis direction from a mirror segmentation ratio according to the number of segments in the Y-axis direction read from belowmentioned Y-axis assignment information 152. Since characteristics as illustrated in FIG. 4C are exhibited in the optical intensity distribution in the Y-axis direction when the mirror regions are not segmented, the segmentation ratio of the mirrors corresponding to the number of segments in the Y-axis direction is set such that the intensities (optical power levels) of light reflected by the segmented regions arranged in the Y-axis direction are approximately the same level (as described in detail below). Since the output ports are arranged in the positive Y-axis direction, the region determining unit 12 assigns the same number of segmented regions as the number of output ports in the Y-axis direction to the output ports arranged in order from the origin 0. The region determining unit 12 is an example of a region determining unit in the embodiments.

In the first embodiment, when segmented regions are assigned to each combination of channel and output port, the region determining unit 12 judges whether or not to use the segmented region to transmit the optical signals. Specifically, the region determining unit 12 obtains the optical signal transmission destinations of the channels from the provisioning information and judges, for each segmented region, whether or not the output port assigned to each segmented region is included in the transmission destination of the channel assigned to the same segmented region. If an output port assigned to a segmented region is included in the transmission destination of the channel assigned to the same segmented region, the region determining unit 12 determines to use the same segmented region.

The X-axis controller 13 conducts setting of the X-axis direction of the mirrors included in the mirror array 114 according to the assignment of the segmented region channels determined by the region determining unit 12, and according to the range in the X-axis direction. Specifically, when the segmented regions are added or erased and the X-axis direction range of the segmented region is changed by the region determining unit 12, the X-axis controller 13 changes the setting of the X-axis direction of the mirrors included in the mirror array 114 according to the changes by the region determining unit 12.

The Y-axis controller 14 conducts setting of the Y-axis direction of the mirrors included in the mirror array 114 according to the range in the Y-axis direction of the segmented regions that are determined to be used by the region determining unit 12. Specifically, the Y-axis controller 14 controls the rotation angle with the X-axis as the rotational axis of the mirrors included in each segmented region such that the reflected light beam enters the output port assigned to each segmented region. The Y-axis controller 14 also conducts settings to increase a mirror loss of the mirrors included in the segmented region determined by the region determining unit 12 not to be used for transmitting the optical signals such that the reflected light beam does not enter any output port. For example, the Y-axis controller 14 changes the tilt of the mirrors with respect to the XY flat plane based on the X-axis as the rotational axis to increase the mirror loss by causing the reflected light beam to not enter any of the output ports. When segmented regions are added or erased and the Y-axis direction range of the segmented regions is changed by the region determining unit 12, the Y-axis controller 14 changes the setting of the Y-axis direction of the mirrors included in the mirror array 114 according to the change by the region determining unit 12. The Y-axis controller 14 is an example of a controller in the embodiments.

The region determining unit 12, the X-axis controller 13, and the Y-axis controller 14 may each be electronic circuits for example. Moreover, the region determining unit 12, the X-axis controller 13, and the Y-axis controller 14 may be operated by a program implemented by one processor. Moreover, the region determining unit 12, the X-axis controller 13, and the Y-axis controller 14 may be operated by programs implemented by a plurality of processors. Additionally, the X-axis controller 13 and the Y-axis controller 14 may be electronic circuits, and one processor may implement a program to be operated as the region determining unit 12 to control the X-axis controller 13 and the Y-axis controller 14.

The database 15 is a non-volatile memory such as, for example, a flash memory or an Electrically Erasable Programmable Read-Only Memory (EEPROM) and the like. The database 15 includes the X-axis assignment information 151 and the Y-axis assignment information 152. The database 15 also includes associations of output ports and rings connected to the output ports (not illustrated).

FIG. 5 is an example of X-axis assignment information 151. The X-axis assignment information 151 is information on the desired number of mirrors in the X-axis direction of the segmented region according to the modulation system and the signal speed of the channel. In the example illustrated in FIG. 5, items for the signal speed, the modulation system, the desired number of mirrors in the X-axis direction, and the modulation speed are depicted. The modulation speed is not included in the provisioning information but may be derived from the signal speed and the modulation system. For example, in a channel with a signal speed of 10 G and an NRZ modulation system, the modulation speed is 10 Gbps. For example, in a channel that has a modulation system that is DQPSK and a signal speed of 40 G, the modulation speed is 20 Gbps since DQSPK is able to transmit two bits at once.

The number of desired mirrors in the X-axis direction corresponding to the signal speed and the modulation system and held in the X-axis assignment information 151 is set such that the spread in the wavelength direction (X-axis direction) of the channels as illustrated in FIG. 4A is not divided. If the spread in the wavelength direction of a channel is divided, there is a risk that the channels may not be able to be decoded on the reception side.

As illustrated in FIG. 5, the spread in the wavelength direction of the channels increases in correspondence with an increase in the modulation speed. This is because, for example, when amplitude modulation is applied to a carrier wave of a frequency fc with a sine wave of a frequency fm, side bands are produced at fc+fm and fc−fm on both sides of the frequency spectrum fc of the carrier wave. Since the frequency fm increases when the modulation speed increases, side bands are produced away from the carrier wave when the modulation speed increases. Therefore, the spread of the wavelength direction of the channels increases along with an increase in the modulation speed.

Moreover, the wavelength direction spread of the channels differs according to the modulation system even with the same modulation speed since the accompaniment of noise differs according to the modulation system. For example, in the X-axis assignment information 151 illustrated in FIG. 5, the non-return to zero (NRZ) light beam with a signal speed of 10 G and the dual polarization quadrature phase shift keying (DP-QPSK) light beam with a signal speed of 40 G exhibit a large spread in the wavelength direction of the channels since noise tends to accompany DP-QPSK more easily despite both channels having a modulation speed of 10 G. As a result, the DP-QPSK light beam with a signal speed of 40 G has more desired mirrors in the X-axis direction of the segmented regions than the NRZ light beam with a signal speed of 10 G.

FIG. 6 is an example of the Y-axis assignment information 152. The Y-axis assignment information 152 is information about the segmentation ratio of the mirrors arranged in the Y-axis direction that corresponds to the number of segments in the Y-axis direction of the mirror array 114. The segmentation ratio of the mirrors arranged in the Y-axis direction in the Y-axis assignment information 152 is set such that the intensities of the reflected light in each of the segmented regions arranged in the Y-axis direction are approximately the same when the mirror regions are segmented in the Y-axis direction by a certain number of segments. The segmentation ratio is set in this way due to the amplification of the optical signals by the optical amplifiers located in the preliminary stage of the WDM transmission devices. Since the optical amplifier amplifies all the channels included in the coupled optical signals at once, there is a risk that the level of amplification in each channel may differ when there is a large difference in the optical power levels between the channels included in the amplified optical signals.

In the example illustrated in FIG. 6, when there are two segments in the Y-axis direction, the two segmented regions are arranged in the Y-axis direction of the mirror regions and the ratio of the number of mirrors in the Y-axis direction of the two segmented regions is 100:100. In the example illustrated in FIG. 6, when there are three segments in the Y-axis direction, the three segmented regions are arranged in the Y-axis direction of the mirror regions and the ratio of the number of mirrors in the Y-axis direction of the three segmented regions is 80:40:80 in order from the origin. As illustrated in FIG. 4C, the distribution of the optical power levels in the Y-axis direction of the channels is not uniform and is stronger near the center. Thus with regard to the three segmented regions arranged in the Y-axis direction, the optical power levels of the reflected light in each of the segmented regions are not approximately the same levels even if the number of mirrors included in the Y-axis direction of the mirror array 114 are arranged in equal portions. Therefore, the number of mirrors in the Y-axis direction of the segmented region arranged in the middle of the three segmented regions arranged in the Y-axis direction is smaller in comparison to the other two segmented regions to make the optical power level of the reflected light of the segmented regions approximately the same. The segmentation ratio of the number of mirrors in the segmented regions arranged in the Y-axis direction may also be specified based on a range of the Y-axis coordinates of the mirrors.

Figure 7:
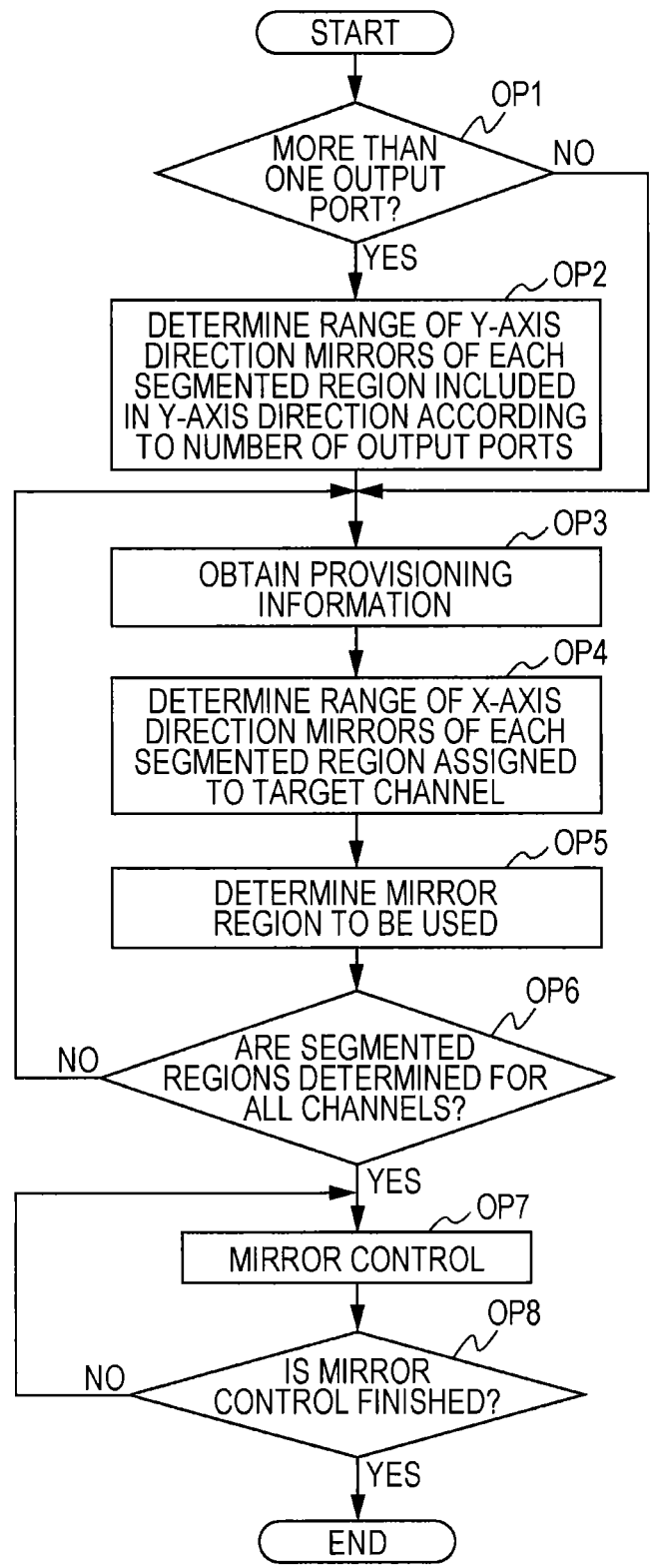
FIG. 7 is a flow chart of mirror control processing of a mirror array.

FIG. 7 is a flow chart of mirror control processing of the mirror array 114. The mirror control processing includes processing from determining a range of the segmented regions included in the mirror array 114 to the setting of each mirror. The flow chart illustrated in FIG. 7 begins with the addition and updating of the provisioning information due to the setting of or changes to the optical network 100 configuration conducted by, for example, an administrator.

In OP1, the region determining unit 12 judges whether the number of output ports is one or more. If the number of output ports is more than one (OP1: Yes), the processing advances to OP2. If there is only one output port, (OP1: No), the processing advances to OP3 since the mirror regions are not segmented in the Y-axis direction.

In OP2, the region determining unit 12 determines the Y-axis direction ranges of the segmented regions arranged in the Y-axis direction and determines assignments to the output ports. Specifically, the region determining unit 12 sets the number of segments in the Y-axis direction of the mirror regions to the same number as the number of output ports. The region determining unit 12 assigns the segmented region segmented only by the number of segments in the Y-axis direction to the output ports according to the arrangement of the output ports. The region determining unit 12 determines the number of mirrors in the Y-axis direction in each segmented region by reading the mirror segmentation ratio of the number of mirrors arranged in the Y-axis direction corresponding to the number of segments in the Y-axis direction from the Y-axis assignment information 152 in the database 15. Then the processing advances to OP3.

In OP3, the region determining unit 12 obtains the provisioning information. The provisioning information is obtained, for example, by monitoring software of the WDM transmission device 50 and is previously held in a storage device such as a register or memory and the like in the WDM transmission device 50. The region determining unit 12 reads the provisioning information from the storage device to obtain the provisioning information. Then the processing advances to OP4.

In OP4, the region determining unit 12 reads the desired number of mirrors in the X-axis direction to match the signal speed and the modulation system of the optical signals of the target channels included in the provisioning information from the X-axis assignment information 151 in the database 15. The region determining unit 12 determines the number of mirrors in the X-axis direction of the segmented regions assigned to the target channels from the number of mirrors. After determining the number of mirrors in the X-axis direction of the segmented regions assigned to the target channels, the region determining unit 12 arranges the segmented regions assigned to the target channels at the position closest to the origin 0 among the mirror regions that have not been assigned to channels. Alternatively, the region determining unit 12 may determine the range of the segmented regions in the X-axis direction such that a center point is positioned in the center when the center point position (X-axis coordinate) of the incident range of the optical signals of the wavelengths λ1-40 channels in the mirror array 114 is known ahead of time. Target channels may be any of the channels included in the input optical signals, and are arranged, for example, as target channels in order from the channel with the smallest wavelength. After the OP4 processing is completed, the ranges in the X-axis and Y-axis directions of the segmented regions assigned to the target channel are determined. In the first embodiment, only the segmented regions assigned to the target channels equal to the number of output ports are present. Then the processing advances to OP5.

In OP5, the region determining unit 12 obtains the transmission destinations of the target channels from information related to target channel routes included in the provisioning information. The region determining unit 12 then determines whether or not to use each segmented region assigned to a target channel for transmitting optical signals. For example, segmented regions assigned to output ports connected to rings included in the transmission destinations of the target channels among the number of segmented regions equal to the number of output ports assigned to the target channels, are determined to be segmented regions to be used for transmission. Segmented regions assigned to output ports connected to rings not included in the transmission destination rings among the number of segmented regions equal to the number of output ports assigned to the target channels, are determined to be segmented regions that are not to be used. Then the processing advances to OP6.

In OP6, the region determining unit 12 judges whether or not determinations have been made about the ranges in the X-axis and Y-axis directions of the segmented regions assigned to the channels and whether or not the segmented regions are to be used, for all of the channels. If determinations have been made about the ranges in the X-axis and Y-axis directions of the segmented regions and whether or not the segmented regions are to be used, for all of the channels (OP6: Yes), the processing advances to OP7. If there are channels for which determinations have not been made about the ranges in the X-axis and Y-axis directions of the assigned segmented regions and whether or not the segmented regions are to be used (OP6: Yes), the processing switches to the next largest target channel and the processing returns to OP3. The processing from OP3 to OP6 is repeated until the segmented regions of all the channels have been determined. The processing from OP3 to OP6 may be conducted for all the channels with one channel as the target channel, or the processing may be conducted on all the channels concurrently using all the channels included in the input optical signals as the target channels.

In OP7, the region determining unit 12 transmits instructions to the X-axis controller 13 and the Y-axis controller 14 to set the mirrors included in the mirror array 114 according to the ranges of the X-axis and Y-axis directions of the determined segmented regions. The X-axis controller 13 sets the X-axis direction of the mirror array 114 according to the instructions. Specifically, the X-axis controller 13 assigns each mirror to the determined channel. The X-axis controller 14 sets the Y-axis direction of the mirror array 114. Specifically, the Y-axis controller 14 sets the rotation angles based on the X-axis as the rotational axis of the mirrors such that the reflected light is outputted to the output port assigned to the segmented region in which the mirrors are included. The Y-axis controller 14 also increases the mirror loss of the mirrors included in the segmented region determined by the region determining unit 12 not to be used for transmitting the optical signals such that the reflected light does not enter any output port.

In OP8, the region determining unit 12 judges whether or not the control of all the mirrors included in the mirror array 114 is completed. If the control of all the mirrors in the mirror array 114 is completed (OP8: Yes), the flow chart illustrated in FIG. 7 is finished. If the control of all the mirrors in the mirror array 114 is not completed (OP8: No), the processing returns to OP7 and OP7 to OP8 are repeated until the control of all the mirrors is completed.

Figure 8:
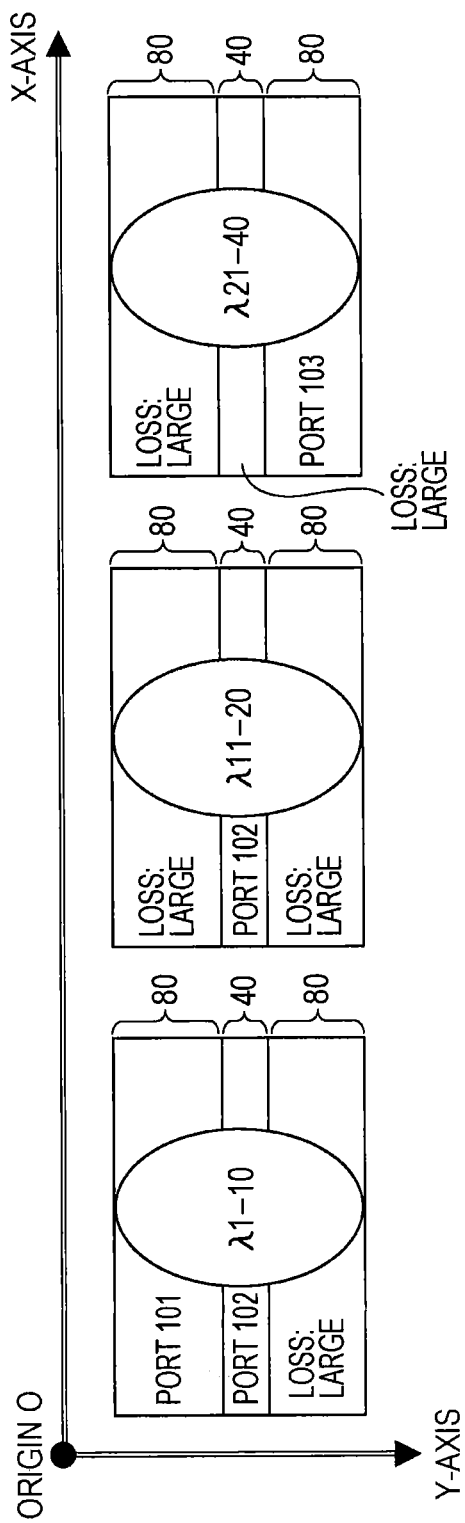
FIG. 8 is an example of optical signal intensity distribution and mirror assignment for the wavelengths λ1-40 in the WDM transmission device.

FIG. 8 is an example of optical signal intensity distribution and mirror assignment for the wavelengths λ1-40 in the WDM transmission device 50 in the optical network 100 illustrated in FIG. 1. The transmission destinations of the optical signals of channels with wavelengths λ1-10 are the ring B (output port 101) and the ring C (output port 102). The transmission destination of the optical signals of channels with wavelengths λ11-22 is the ring C (output port 102). The transmission destination of the optical signals of channels with wavelengths λ21-40 is the ring D (output port 103).

In FIG. 8, since there are three output ports (output ports 101 to 103) in the WDM transmission device 50, the number of segmented regions arranged in the Y-axis direction is three. According to the Y-axis assignment information 152 (see FIG. 6), the ratio of the number of mirrors in the Y-axis direction included in the three segmented region arranged in the Y-axis direction is 80:40:80 (OP2 of FIG. 7). The three segmented regions arranged in the Y-axis direction correspond to the output port arrangement (Y-axis direction arrangement) and are assigned to the output ports. Specifically, the three segmented regions arranged in the Y-axis direction are assigned to the output port 101, the output port 102, and the output port 103 in order from the origin 0 along the positive Y-axis direction. This is to avoid the reflected light of each segmented region from crossing with the reflected light of another segmented region.

Since the transmission destinations of the channels with wavelengths λ1-10 are the output port 101 and the output port 102, the mirrors of the segmented regions assigned to the output ports 101 and 102 are used in the segmented region assigned to the channels of the wavelengths λ1-10. Conversely, since the output port 103 is not included in the transmission destinations of the wavelengths λ1-10, the mirrors of the segmented region assigned to the output port 103 are not used (OP5 in FIG. 7) among the segmented regions assigned to the channels of the wavelengths λ1-10. Therefore, since the mirrors of the segmented region assigned to the output port 103 among the segmented regions assigned to the channels of the wavelengths λ1-10 are not used for transmitting reflected light to any port, the loss is set to be large (OP7 in FIG. 7).

Since the transmission destination of the channels with wavelengths λ11-20 is the output port 102, the mirrors of the segmented region assigned to the output port 102 are used among the segmented regions assigned to the channels of the wavelengths λ11-20. Conversely, since the output ports 101 and 103 are not included in the transmission destinations of the wavelengths λ1-20, the mirrors of the segmented regions assigned to the output ports 101 and 103 are not used (OP5 in FIG. 7) among the segmented regions assigned to the channels of the wavelengths λ1-20. The mirrors of the segmented regions assigned to the output ports 101 and 103 among the segmented regions assigned to the channels of the wavelengths λ11-20 are set to be have a large loss (OP7 in FIG. 7) such that reflected light is not transmitted to any port.

Since the transmission destination of the channels with wavelengths λ21-40 is the output port 103, the mirrors of the segmented region assigned to the output port 103 are used among the segmented regions assigned to the channels of the wavelengths λ21-40. Conversely, since the output ports 101 and 102 are not included in the transmission destinations of the wavelengths λ21-40, the mirrors of the segmented regions assigned to the output ports 101 and 102 are not used (OP5 in FIG. 7) among the segmented regions assigned to the channels of the wavelengths λ21-40. The mirrors of the segmented regions assigned to the output ports 101 and 102 among the segmented regions assigned to the channels of the wavelengths λ21-40 are set to have a large loss (OP7 in FIG. 7) such that the reflected light is not transmitted to any port. Although the above explanation uses the example of a ring network, a similar application may be used on other networks such as a linear network and the following embodiments are the same in this respect.

In the first embodiment, the ranges of the segmented regions in the mirror array 114 in the X-axis direction are determined according to the channels to which the segmented regions are assigned, and the ranges of the segmented regions in the Y-axis direction are determined according to the output ports to which the segmented regions are assigned. By determining the ranges of the segmented regions in the Y-axis direction according to the assigned output ports in this way, the rotation angle of the mirrors based on the X-axis as the rotational axis may differ and the assigned output ports may differ between segmented regions assigned to the same channel. As a result, even if there is a plurality of channel transmission destinations, signals of the same channel may be transmitted to the plurality of transmission destinations without a new device in the existing structure.

Moreover, the ratio of the number of mirrors in the Y-axis direction included in the segmented regions arranged in the Y-axis direction in the mirror array 114 is a segmentation ratio to cause the optical power levels of the reflected light to be segmented equally. As a result, differences in optical power levels between channels transmitted from the output ports may be maintained within a tolerance range, and differences in the optical power levels between channels may be suppressed even when the light is amplified by the optical amplifier in the subsequent stage. Specifically, the same level of optical power level may be kept between channels after amplification.

Second Embodiment

In the first embodiment, the ranges of the segmented regions in the mirror array 114 in the Y-axis direction are determined according to the channels to which the segmented regions are assigned. By determining the ranges of the segmented region in the Y-axis direction in the mirror array 114 according to the first embodiment, segmented regions that are not used for transmitting optical signals exist when the number of transmission destinations is smaller than the number of output ports. For example as illustrated in FIG. 8, the segmented region assigned to the output port 103 with the wavelengths λ1-10 is not used for transmitting optical signals.

In the second embodiment, the WDM transmission device 50 determines the range of the segmented regions in the Y-axis direction in the mirror array 114 such that a usage ratio of the mirrors is improved compared that of the first embodiment. The structure of the WDM transmission device 50 in the second embodiment is similar to that of the first embodiment. The processing related to the determination by the region determining unit 12 of the ranges of the segmented regions in the Y-axis direction in the mirror array 114 in the second embodiment is different from that of the first embodiment. Explanations in the second embodiment that duplicate explanations in the first embodiment will be omitted.

In the second embodiment, the region determining unit 12 sets the number of segmented regions (number of segments in the Y-axis direction) arranged in the Y-axis direction among the segmented region assigned to channels, to a certain number between the number of optical signal transmission destinations of the channels and the number of output ports. The region determining unit 12 assigns segmented regions assigned to channels and segmented only up to the certain number in the Y-axis direction, to each transmission destination of the optical signals of the channels. The region determining unit 12 maintains the difference in optical power levels between channels of the optical signals transmitted from the output ports within the tolerance range. Specifically, the region determining unit 12 adjusts the ranges in the Y-axis direction of the segmented regions assigned to each transmission destination of the channels such that the optical power levels of the reflected light (output light) of the channels is approximately the same level. Since the output ports are arranged in the positive Y-axis direction, the region determining unit 12 assigns the segmented regions in the Y-axis direction assigned to the channels to the transmission destinations of the channels according to the arrangement of the output ports from the origin 0. Details of the processing will be explained with reference to FIG. 9 below.

Figure 9:
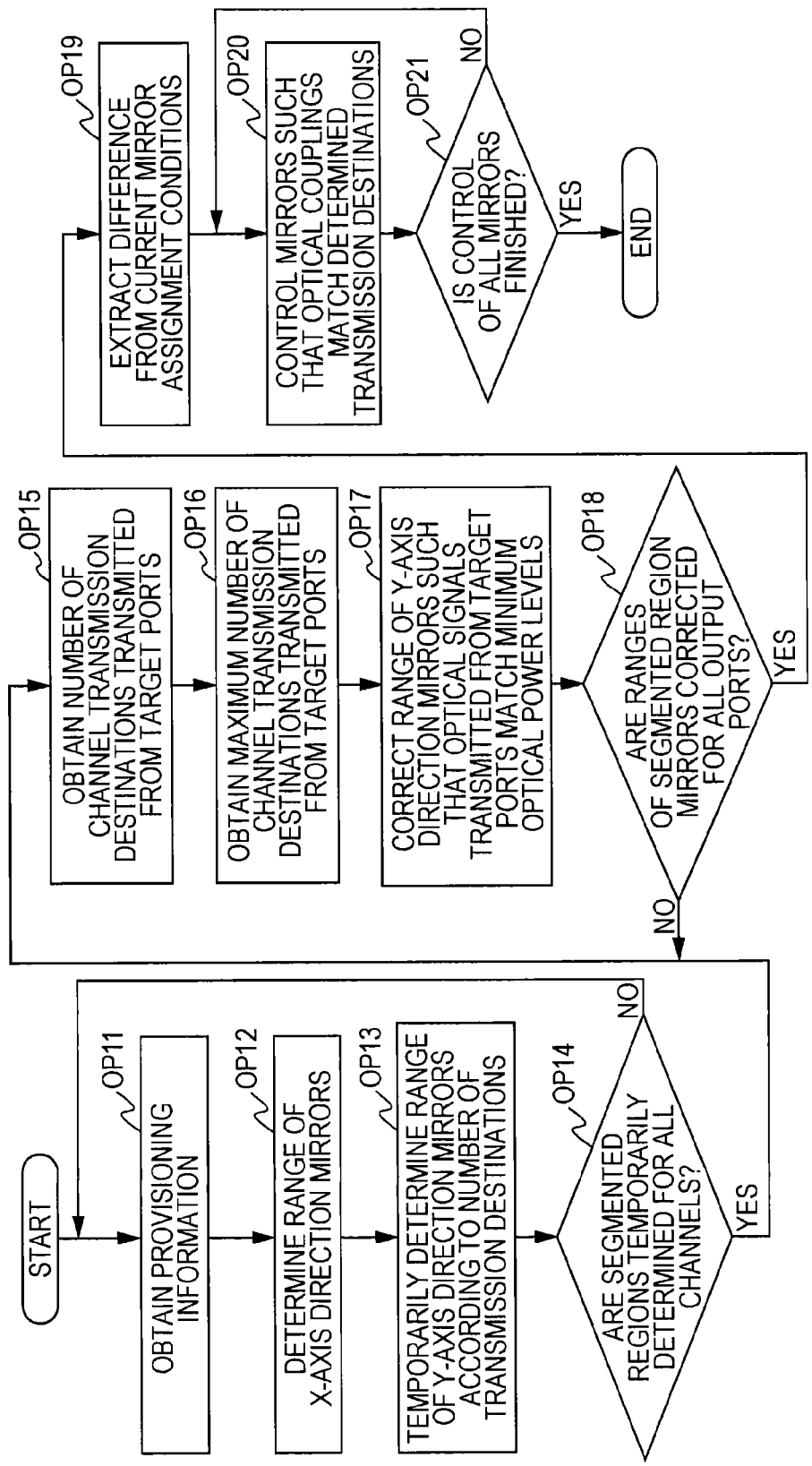
FIG. 9 is a flow chart of mirror control processing of a mirror array according to a second embodiment.

FIG. 9 is a flow chart of mirror control processing of the mirror array 114 according to the second embodiment. The flow chart illustrated in FIG. 9 begins with the addition and updating of the provisioning information due to the setting of or changes to the optical network 100 configuration conducted by, for example, an administrator.

In OP11, the region determining unit 12 reads out and obtains the provisioning information from a storage device in the WDM transmission device 50. Then the processing advances to OP12.

In OP12, the region determining unit 12 reads the desired number of mirrors of the segmented regions in the X-axis direction to match the signal speed and the modulation system of the optical signals of the target channels included in the provisioning information from the X-axis assignment information 151 in the database 15. The region determining unit 12 determines the number of mirrors in the X-axis direction of the segmented regions assigned to the target channels from the number of mirrors. After determining the number of mirrors in the X-axis direction of the segmented regions assigned to the target channels, the region determining unit 12 arranges the segmented regions assigned to the target channels in the position closest to the origin 0 among the mirror regions that have not been assigned to channels. Alternatively, the region determining unit 12 may determine the range of the segmented regions in the X-axis direction such that a center point is positioned in the center when the center point position (X-axis coordinate) of the incident range of the optical signals of the wavelengths λ1-40 channels in the mirror array 114 is known ahead of time. Target channels are any of the channels included in the input optical signals, and are arranged, for example, as target channels in order from the channel with the smallest wavelength. Then the processing advances to OP13.

In OP13, the region determining unit 12 segments the segmented region assigned to the target channels in the Y-axis direction and temporarily determines the range of mirrors of the segmented regions in the Y-axis direction. Specifically, the region determining unit 12 sets the number of segments in the Y-axis direction of the segmented regions of the target channels to the number of transmission destinations of the target channels included in the provisioning information. The region determining unit 12 assigns each segmented region segmented only by the number of segments in the Y-axis direction to the transmission destinations of the target channels according to the arrangement of the output ports. The region determining unit 12 assigns the mirrors in the Y-axis direction in each segmented region by reading the ratio of the number of mirrors in the Y-axis direction of the segmented regions arranged in the Y-axis direction corresponding to the number of segments in the Y-axis direction from the Y-axis assignment information 152 stored in the database 15. As a result, the ranges of the mirrors in the X-axis and the Y-axis directions of the segmented regions assigned to the target channels are temporarily determined. Then the processing advances to OP14.

In OP14, the region determining unit 12 judges whether or not the ranges of the mirrors in the X-axis and Y-axis directions of the assigned segmented region have been temporarily determined for all the channels included in the input optical signals. If temporary determinations have been made about the ranges of the mirrors in the X-axis and Y-axis directions of the segmented regions for all of the channels (OP14: Yes), the processing advances to OP15. If there are channels for which temporary determinations have not been made about the ranges of the mirrors in the X-axis and Y-axis directions of the segmented regions (OP14: No), the processing returns to OP11 and the processing from OP11 to OP14 is repeated on the channels for which temporary determinations have not been made about the ranges of the mirrors in the X-axis and Y-axis directions of the segmented regions. The processing from OP11 to OP14 may be conducted for all the channels with one channel as the target channel, or the processing may be conducted on all the channels concurrently using all the channels included in the input optical signals as the target channels.

In OP15, the region determining unit 12 obtains the number of transmission destinations of the channels transmitted from the target ports. If there is a plurality of channels outputted from the target ports, the region determining unit 12 obtains the number of transmission destinations for each channel. Then the processing advances to OP16. A target port may be any one of the output ports.

In OP16, the region determining unit 12 obtains the largest number of transmission destinations among the number of transmission destinations of the channels transmitted from the target ports. Then the processing advances to OP17.

In OP17, the region determining unit 12 corrects the ranges of the segmented regions in the Y-axis direction assigned to target ports as transmission destinations such that the optical signals of the channels transmitted from the target ports have the smallest optical power levels among the optical signals of the channels transmitted from the target ports. As a result, the ranges of the mirrors of the segmented regions in the X-axis direction and the Y-axis direction are confirmed.

The reflected light optical power levels of the channels become smaller as the number of segmented regions segmented in the Y-axis direction and assigned to channels increases. In the second embodiment in OP13, the power optical levels become smaller as the number of transmission destinations of the channels increases since the number of segmented regions segmented in the Y-axis direction and assigned to the channels is temporarily determined according to the number of transmission destinations of the channels. Therefore, the channel having the smallest optical power level of the target ports is the channel having the largest number of transmission destinations among the channels transmitted from the target ports. The largest number of transmission destinations among the channels transmitted from the target ports is obtained in OP16.

Therefore, the region determining unit 12 conducts the following processing as the processing in OP17. The region determining unit 12 obtains the ratio of the number of mirrors in the Y-axis direction of the segmented regions arranged in the Y-axis direction corresponding to the largest number of transmission destinations obtained in OP16 for the target ports from the Y-axis assignment information 152 in the database 15. The region determining unit 12 corrects the Y-axis direction mirror ranges of the segmented regions assigned to target ports as transmission destinations, to a mirror range of all or a portion of segmented regions included in the segmented regions temporarily determined in OP13 among the segmented regions segmented with the newly obtained ratio. Then the processing advances to OP18.

In OP18, the region determining unit 12 judges whether or not the correction of the Y-axis direction mirror ranges of the segmented regions assigned to the output ports as transmission destinations has been completed for all of the output ports. If the correction of the Y-axis direction mirror ranges of the segmented regions assigned as transmission destinations has been completed for all of the output ports (OP18: Yes), the processing advances to OP19. If there are output ports for which the correction of the Y-axis direction mirror ranges of the segmented regions assigned as transmission destinations has not been completed (OP18: No), the processing returns to OP15. The processing from OP15 to OP18 is repeated on the output ports for which the correction of the Y-axis direction mirror ranges of the segmented regions assigned as transmission destinations has not been completed. The processing from OP15 to OP18 may be conducted on an output port with one output port as a target port, or may be conducted concurrently on the output ports with all the output ports as target ports.

In OP19, the region determining unit 12 extracts the difference between the current mirror assignment conditions and the new mirror assignments determined in the processing of OP11 to OP18. The processing then advances to OP20.

In OP20, the region determining unit 12 instructs the X-axis controller 13 and the Y-axis controller 14 to change the settings for the difference in the mirror assignments extracted in OP19. The X-axis controller 13 and the Y-axis controller 14 set the mirror array 114 to match the difference of the mirror assignments according to the instruction from the region determining unit 12. Then the processing advances to OP21.

In OP21, the region determining unit 12 judges whether or not the control of all the mirrors included in the mirror array 114 is completed. If the control of all the mirrors in the mirror array 114 is completed (OP21: Yes), the flow chart illustrated in FIG. 9 is finished. If the control of all the mirrors in the mirror array 114 is not completed (OP21: No), the processing returns to OP20 and the processing in OP20 to OP21 are repeated until the control of all the mirrors is completed.

FIGS. 10A and 10B illustrate examples of optical signal intensity distribution and mirror assignments of the channels with the wavelengths $\lambda 1$-40 in the WDM transmission device 50 according to the second embodiment. The transmission destinations of the optical signals of channels with wavelengths $\lambda 1$-10 are the ring B (output port 101) and the ring C (output port 102). The transmission destination of the optical signals of channels with wavelengths $\lambda 11$-22 is the ring C (output port 102). The transmission destination of the optical signals of channels with wavelengths $\lambda 21$-40 is the ring D (output port 103).

FIG. 10A is an example of temporarily determined mirror assignments for channels of wavelengths $\lambda 1$-40 at the point of time when the processing in OP13 of FIG. 9 is completed. Since the transmission destinations of the channels with wavelengths $\lambda 1$-10 are the output port 101 and the output port 102, the segmented region assigned to the channels with the wavelengths $\lambda 1$-10 is segmented into two segmented regions. The number of mirrors of the two segmented regions in the Y-axis direction is divided in two at a ratio of 100:100. The segmented regions are assigned respectively to the output port 101 and the output port 102 that are transmission destinations in the positive Y-axis direction from the origin 0 corresponding to the arrangement of the output ports. Since the transmission destination of the channels with the wavelengths $\lambda 11$-20 is the output port 102, the segmented region assigned to the channels with the wavelengths $\lambda 11$-20 is not segmented and is assigned to the output port 102 that is the transmission destination. Since the transmission destination of the channels with the wavelengths $\lambda 21$-40 is the output port 103, the segmented region assigned to the channels with the wavelengths $\lambda 21$-40 is not segmented and is assigned to the output port 103 that is the transmission destination.

FIG. 10B is an example of finally determined mirror assignments for channels of wavelengths $\lambda 1$-40 at the point of time when the processing in OP17 of FIG. 9 is completed.

In the example illustrated in FIG. 10A, the reflected light of the channels with the wavelengths $\lambda 1$-10 and wavelengths $\lambda 11$-20 is outputted from the output port 102. The transmission destinations of the channels with wavelengths $\lambda 1$-10 are the output port 101 and the output port 102. The transmission destination of the channels with wavelengths $\lambda 11$-20 is only the output port 102. Therefore, the largest number of transmission destinations of the channels transmitted from the output port 102 is two (OP16 in FIG. 9).

In the example illustrated in FIG. 10A, among the segmented regions assigned to the channels with the wavelengths $\lambda 1$-10 and wavelengths $\lambda 11$-20, the mirror ranges in the Y-axis direction are corrected in a segmented region A1 and a segmented region B1 assigned to the output port 102 as the transmission destination such that the power level of the reflected light is approximately the same (OP17 in FIG. 9). There are two channel transmission destinations with the wavelengths $\lambda 1$-10 and the largest number of the transmission destinations of the channels transmitted from the output port 102 is also two. As a result, the reflected light of the segmented region A1 has the smallest optical power level among the channels outputted from the output port 102. Thus the range of the segmented region A1 in the Y-axis direction is not corrected (FIG. 10B). Conversely, since there is one transmission destination of the channels with the wavelengths $\lambda 11$-20, the segmented region B1 is not segmented in the stage of temporary determination (FIG. 10A). As a result, during the temporary determination, the optical power level of the reflected light of the segmented region B1 is roughly twice the amount of the optical power level of the reflected light of the segmented region A1. The segmented region B1 is segmented in the Y-axis direction by the largest number (2) of transmission destinations of the channels transmitted from the output port 102 such that the optical power level of the reflected light becomes an optical power level very close to that of the reflected light of the segmented region A1. Therefore, the range of the mirrors of the segmented region B1 in the Y-axis direction is corrected to a range of mirrors in the Y-axis direction of a segmented region B2 included in the segmented region B1 as illustrated in FIG. 10B.

The segmented region A2 assigned to the combination of the channels with the wavelengths $\lambda 1$-10 and the output port 101 as the transmission destination, and the segmented region C1 assigned to the combination of the channels with the wavelengths $\lambda 21$-40 and the output port 103 as the transmission destination, are not corrected. There are two channel transmission destinations with the wavelengths $\lambda 1$-10 and the largest number of the transmission destinations of the channels transmitted from the output port 101 is also two. There are two channel transmission destinations with the wavelengths $\lambda 21$-40 and the largest number of the transmission destinations of the channels transmitted from the output port 103 is also two. Accordingly, in the optical power levels of the reflected light of the segmented regions A2 and C1, the ranges in the Y-axis direction of the segmented regions A2 and C1 are not corrected since the number of output ports of transmission destinations to which these segmented regions are assigned is expected to be the smallest number.

As described above, the segmented region assigned to the channels with the wavelengths λ11-20 illustrated in FIG. 10B is segmented into two segmented regions. One of the segmented regions is assigned to the output port 102 that is the transmission destination of the channels with the wavelengths λ11-20, and the other segmented region is set to have a large loss such that light is not transmitted to any of the output ports. In the case illustrated in FIG. 10B, either of the segmented regions assigned to the channels with the wavelengths λ11-20 may be assigned to the output port 102 that is the transmission destination. However, when there is a plurality of channel transmission destinations, each segmented region is assigned to the respective transmission destination according to the arrangement order of the output ports.

In the second embodiment, the segmented regions assigned to channels are segmented in the Y-axis direction only by the number of transmission destinations, and the Y-axis direction ranges of the segmented regions are temporarily determined by assigning the segmented regions created by the segmenting in Y-axis direction to respective transmission destinations. Subsequently, the Y-axis direction ranges of the segmented regions are corrected such that the optical power level between the channels transmitted from the output ports becomes the smallest optical power level. In the first embodiment as illustrated in FIG. 8, segmented regions that are not used are present even among the segmented regions assigned to the channels with the wavelengths λ1-40. Conversely, in the second embodiment as illustrated in FIG. 10B, the segmented region that is not used is only one portion of the segmented regions assigned to the channels with the wavelengths λ11-20, and all of the segmented regions are used for the channels with the wavelengths λ1-10 and λ21-40. Therefore in the second embodiment, the number of mirrors not being used (mirrors set for a large loss) is smaller than that of the first embodiment, and thus the usage efficiency of the mirror array 114 may be improved.

Third Embodiment

In a third embodiment, the region determining unit 12 sets the number of segmented regions arranged in the Y-axis direction among the segmented regions assigned to channels, from the number of transmission destinations of the channels to the number of output ports. The region determining unit 12 assigns segmented regions segmented only up to a certain number in the Y-axis direction and assigned to the channels, to each channel transmission destination. The region determining unit 12 monitors the power levels of the light transmitted from the output ports and adjusts the ranges of the segmented regions in the Y-axis direction in order to maintain the optical power levels of the channels transmitted from the output ports within a target range while referring to the monitor values. Since the output ports are arranged in the positive Y-axis direction, the region determining unit 12 assigns the segmented regions in the Y-axis direction assigned to the channels to the transmission destinations of the channels according to the arrangement of the output ports from the origin 0. Explanations in the third embodiment that duplicate explanations in the first embodiment will be omitted.

Figure 11:
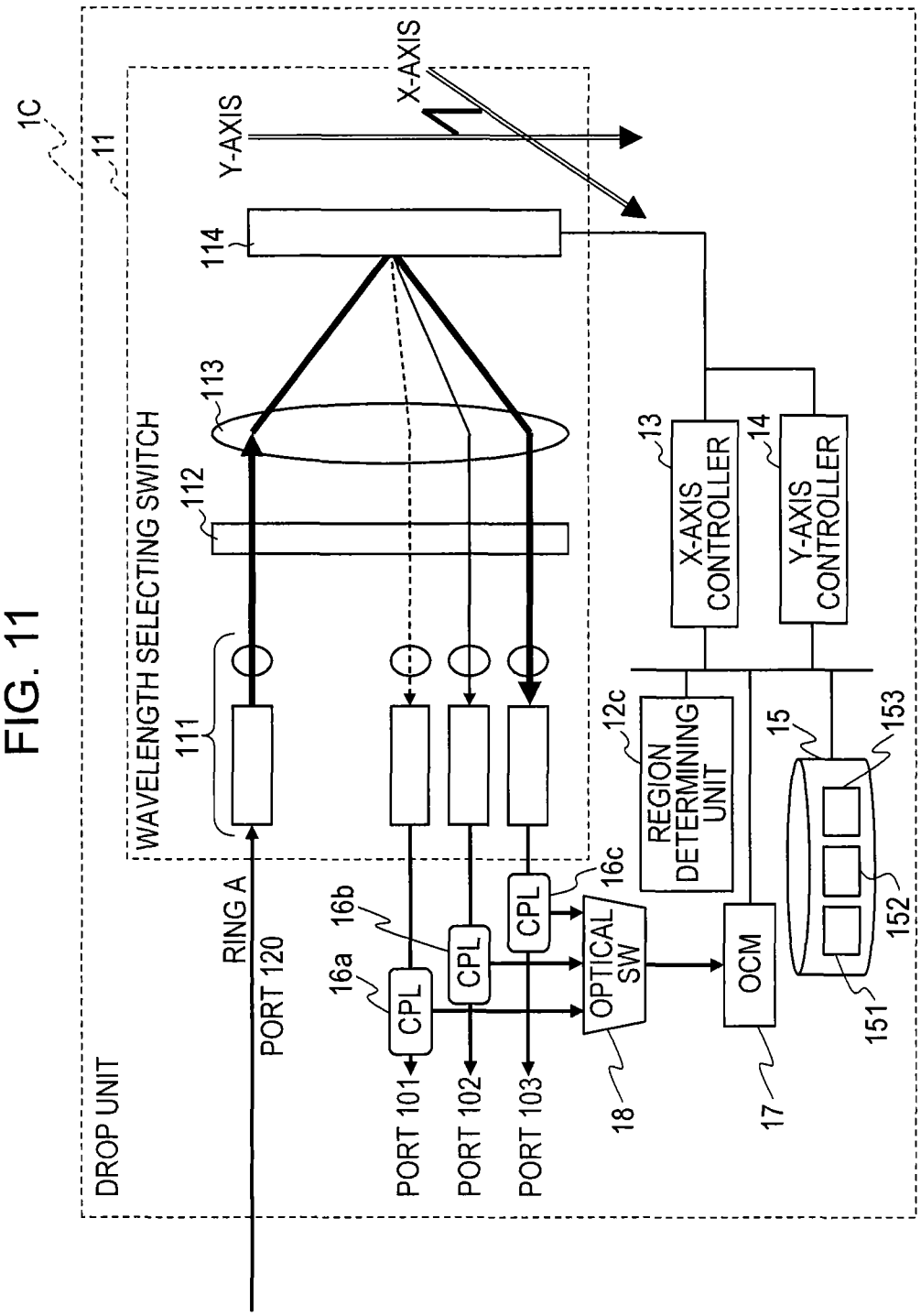
FIG. 11 is an example of a configuration of drop unit of a WDM transmission device according to a third embodiment.

FIG. 11 is an example of a configuration of drop unit 1C of the WDM transmission device 50 according to the third embodiment. The drop unit 1C of the WDM transmission device 50 includes the WSS 11, a region determining unit 12c, the X-axis controller 13, the Y-axis controller 14, the database 15, optic couplers 16a to 16c, an optical channel monitor (OCM) 17, and an optical switch 18.

Optical signals outputted from output optical systems 111b of the WSS 11 are branched by the optic couplers 16a to 16c connected to the output optical systems 111b, pass through the optical switch 18, and then are inputted into the OCM 17. The optical switch 18 performs switching of the branched light from the output ports 101 to 103 to input light that is inputted into the OCM 17. The OCM 17 monitors the optical power levels and the wavelengths within the signal band of the channels included in the input light from the optical switch 18.

The region determining unit 12c determines ranges of mirrors in the X-axis direction of the segmented regions assigned to the channels in the same way as in the first embodiment. The region determining unit 12c segments the segmented regions assigned to the channels in the Y-axis direction by the number of transmission destinations of the channels, assigns the segmented regions created by the segmentation to the transmission destinations, and temporarily determines the ranges of the mirrors in the Y-axis direction of the segmented regions. The region determining unit 12c causes the temporarily determined mirror assignments to be incorporated through the X-axis controller 13 and the Y-axis controller 14. The region determining unit 12c then obtains monitor values of the reflected light optical power levels of the channels from the OCM 17 for each output port, and checks whether or not the reflected light optical power levels of the channels are within the target range. If the monitor values of the outputted reflected light optical power levels of the channels for each output port are not within the target range, the region determining unit 12c corrects the ranges of the mirrors in the Y-axis direction of the segmented regions such that the values of monitor values of the reflected light optical power levels of the channels fall within the target range. Details of the processing conducted by the region determining unit 12c are described below with reference to FIG. 13.

FIG. 12 is an example of optical power level limit information 153 recorded in the database 15. In the third embodiment, the database 15 includes the optical power level limit information 153 in addition to the X-axis assignment information 151 and the Y-axis assignment information 152. The optical power level limit information 153 is information of set target ranges of optical power levels of the optical signals of the channels corresponding to the number of channels transmitted from the output ports. In the example illustrated in FIG. 12, the optical power level target range is defined with an upper limit threshold and a lower limit threshold. The region determining unit 12c obtains the target range of the monitor values of the reflected light optical power levels of the channels for each output port by reading the optical power level limit information 153.

FIG. 13 is a flow chart of mirror control processing of the mirror array 114 according to the third embodiment. The flow chart illustrated in FIG. 13 begins with the addition and updating of the provisioning information due to the setting of or changes to the optical network 100 configuration conducted by, for example, an administrator.

The processing from OP31 to OP34 is similar to the processing of OP11 to OP14 in FIG. 9 of the second embodiment and the description thereof will be omitted here.

In OP35, the region determining unit 12c extracts the difference between the current mirror assignment conditions and the temporarily determined mirror assignment conditions. The processing then advances to OP36.

In OP36, the region determining unit 12c obtains the optical power level target ranges of the reflected light of the segmented regions by reading the optical power level limit information 153 in the database 15. The optical power level target ranges of the reflected light of the segmented regions are set to match a channel with the largest number of transmission destinations of at least one channel transmitted from the output port of a transmission destination to which a segmented region is assigned. Specifically, the region determining unit 12c obtains, for each output port, the largest number of transmission destinations among the transmission destinations of at least one channel transmitted from the output ports. The region determining unit 12c sets the target range corresponding to the largest obtained number of transmission destinations for the output ports to which segmented regions are assigned, which is read from the optical power level limit information 153, as the reflected light target range of the segmented regions. Then the processing advances to OP37.

In OP37, the region determining unit 12c instructs the X-axis controller 13 and the Y-axis controller 14 to change the settings according to the difference in the mirror assignments extracted in OP35. The X-axis controller 13 and the Y-axis controller 14 set the mirror array 114 to match the difference of the mirror assignments according to the instruction from the region determining unit 12c. Then the processing advances to OP38.

In OP38, the region determining unit 12c obtains the monitor values of the optical signal optical power levels of the channels transmitted from the target ports. Then the processing advances to OP39. The target port may be any one of the output ports.

In OP39, the region determining unit 12c judges whether or not the monitor values of the optical power levels of the optical signals of the channels transmitted from the target ports are within the target range obtained in OP36. If the monitor values of the optical power levels of the optical signals of the channels transmitted from the target ports are within the target range obtained in OP36 (OP39: Yes), the processing advances to OP42. If the monitor value of the optical signal optical power levels of at least one channel among the optical signals of the channels transmitted from the target ports are outside of the target range obtained in OP36 (OP39: No), the processing advances to OP40.

In OP40, the region determining unit 12c checks the segmented regions assigned to a combination of a target port as the transmission destination and a channel with an optical power level monitor value outside of the target range in order to confirm the ranges in the X-axis and Y-axis directions of the segmented regions with the assignments after the changes. The region determining unit 12c erases the changes to the Y-axis direction range of the segmented regions assigned to the combination of the target port as the transmission destination and the channels with the optical power level monitor value outside of the target range, and returns the Y-axis direction ranges to the ranges before the changes. Then the processing advances to OP41.

In OP41, the region determining unit 12c sets a change amount of the number of mirrors included in the Y-axis direction for the segmented regions with optical power level monitor values outside of the target range to half of the change amount before the change, and causes the change to be incorporated through the Y-axis controller 14. For example, by incorporating, in OP37, the change of the difference extracted in OP35, the number of mirrors in the Y-axis direction of the segmented region is increased, and the following is performed if the optical power level monitor values of the reflected light of that segmented region exceed the upper limit threshold of the target range. The region determining unit 12c causes the amount (increased portion) of the change in the number of mirrors in the Y-axis direction corresponding to the difference of the segmented region to become half of the amount from the previous change. The region determining unit 12c then increases the range in the Y-axis direction of the segmented region only by the amount (increased portion) of the change in the number of mirrors that is half of the amount of the previous change. However, this increased range is a range that continues with the current segmented region included in the difference extracted in OP35. Subsequently, the monitor value of the reflected light optical power level of the segmented region after the change becomes a value that is smaller than the previous monitor value and approaches the upper limit threshold of the target range whether the value is inside or outside of the target range. This is similar to a case in which the range in the Y-axis direction of the segmented region is erased by the incorporation of the difference. The processing then returns to OP38 and the processing from OP38 to OP41 is repeated until the monitor values of the optical signal optical power levels of the channels transmitted from the target ports fall within the target range.

In OP42, the region determining unit 12c judges whether or not the correction of the Y-axis direction mirror ranges of the segmented regions assigned to the output ports as transmission destinations has been completed for all of the output ports. If the correction of the Y-axis direction mirror ranges of the segmented regions assigned as transmission destinations has been completed for all of the output ports (OP42: Yes), the processing of the flow chart illustrated in FIG. 13 is completed. If there are output ports for which the correction of the Y-axis direction mirror ranges of the segmented regions assigned as transmission destinations has not been completed (OP42: No), the processing returns to OP38. The processing from OP38 to OP42 is repeated on the output ports for which the correction of the Y-axis direction mirror ranges of the segmented regions assigned as transmission destinations has not been completed. The processing from OP38 to OP42 may be conducted on each output port with one output port as a target port, or may be conducted concurrently on the output ports with all the output ports as target ports.

FIGS. 14A, 14B, and 14C illustrate examples of optical signal intensity distribution and mirror assignments of the channels with the wavelengths λ1-40 in the WDM transmission device 50 according to the third embodiment. Similar to FIGS. 8, 10A, and 10B, the transmission destinations of the optical signals of channels with wavelengths λ1-10 are the ring B (output port 101) and the ring C (output port 102) in FIGS. 14A, 14B, and 14C. The transmission destination of the optical signals of channels with wavelengths λ11-22 is the ring C (output port 102). The transmission destination of the optical signals of channels with wavelengths λ21-40 is the ring D (output port 103).

FIG. 14A illustrates an example of initial settings of mirror assignments in the Y-axis direction of the mirror array 114. FIG. 14A illustrates the mirror assignment conditions at the point of time when OP32 in FIG. 13 is completed. The segmented regions assigned to the channels included in the input optical signals are assigned to the output port 101 in the initial setting without being segmented in the Y-axis direction.

FIG. 14B illustrates the temporarily determined mirror assignments of the channels with the wavelengths λ1-40 at the point of time when OP33 in FIG. 13 is completed. Since the transmission destinations of the channels with wavelengths λ1-10 are the output port 101 and the output port 102, the segmented region assigned to the channels of the wavelengths λ1-10 is segmented into two segmented regions. The number of mirrors of the two segmented regions in the Y-axis direction is divided in two at a ratio of 100:100. The segmented regions are assigned respectively to the output port 101 and the output port 102 that are transmission destinations corresponding to the order of the output ports. Since the transmission destination of the channels with the wavelengths λ11-20 is the output port 102, the segmented region assigned to the channels with the wavelengths λ11-20 is not segmented and is assigned to the output port 102 that is the transmission destination. Since the transmission destination of the channels with the wavelengths λ21-40 is the output port 103, the segmented region assigned to the channels with the wavelengths λ21-40 is not segmented and is assigned to the output port 103 that is the transmission destination.

The difference of the segmented region assigned to the channels with the wavelengths λ1-10 between the current assignment conditions (FIG. 14A initial setting) and the temporarily determined mirror assignment (FIG. 14B) is the segmented region A12 being the bottom portion of the segmented region segmented in two in FIG. 14B. The assignment of the segmented region A12 is changed from the output port 101 of the temporarily determined (FIG. 14B) mirror assignment to the output port 102. The difference of the segmented region assigned to the channels with the wavelengths λ11-20 between the current assignment conditions (FIG. 14A initial setting) and the temporarily determined mirror assignment (FIG. 14B) is the entire segmented region B11. The assignment of the segmented region B11 is changed from the output port 101 of the temporarily determined (FIG. 14B) mirror assignment to the output port 102. The difference of the segmented region assigned to the channels with the wavelengths λ21-40 between the current assignment conditions (FIG. 14A initial setting) and the temporarily determined mirror assignment (FIG. 14B) is the entire segmented region C11. The assignment of the segmented region C11 is changed from the output port 101 of the temporarily determined (FIG. 14B) mirror assignment to the output port 103.

The target range as illustrated in FIG. 14B of the reflected light optical power level of each of the segmented regions after the temporary determination of the mirror assignments is described below. The channel transmitted from the output port 101 is only the channel with the wavelengths λ1-10 and the number of transmission destinations of the channel with the wavelengths λ1-10 is two. Therefore, the target range of the segmented region A11 assigned to the combination of the channel with the wavelengths λ1-10 and the output port 101 as the transmission destination is a range from −10.0 dBm to 2.2 dBm that matches the two transmission destinations as indicated in the optical power level limit information 153 in FIG. 12. Since the segmented region A11 illustrated in FIG. 14B is one of the segmented portions of the segmented region assigned to the wavelengths λ1-10 and segmented in two in the Y-axis direction, the reflected light optical power level of the segmented region A11 falls within the target range and is confirmed as the range of the segmented region A11 in the Y-axis direction (OP39 in FIG. 13).

The channel transmitted from the output port 103 is only the channel with the wavelengths λ21-40 and there is one transmission destination of the channel with the wavelengths λ21-40. Therefore, the target range of the segmented region C11 assigned to the combination of the channel with the wavelengths λ21-40 and the output port 103 as the transmission destination is a range from −8.1 dBm to 2.5 dBm that matches the one transmission destination as indicated in the optical power level limit information 153 in FIG. 12. Since the segmented region C11 illustrated in FIG. 14B is the entire segmented region assigned to the wavelengths 221-40, the reflected light optical power level of the segmented region C11 falls within the target range and is confirmed as the range of the segmented region C11 in the Y-axis direction (OP39 in FIG. 13).

The channels transmitted from the output port 102 are the channels with the wavelengths λ1-10 and the channels with the wavelengths λ11-20. The number of transmission destinations of the channels with the wavelengths λ1-10 is two (output ports 101 and 102), and the number of transmission destinations of the channels with the wavelengths λ11-20 is one (output port 102). Therefore, the target range of the segmented region A12 assigned to the combination of the channels with the wavelengths λ1-10 and the output port 102 as the transmission destination, and the target range of the segmented region B11 assigned to the combination of the channels with the wavelengths λ11-20 and the output port 102 as the transmission destination, has a range from −10.0 dBm to 2.2 dBm that matches the two transmission destinations as indicated in the optical power level limit information 153 in FIG. 12. Since the segmented region A12 illustrated in FIG. 14B is one of the segmented portions of the segmented region assigned to the wavelengths λ1-10 and segmented in two in the Y-axis direction, the reflected light optical power level of the segmented region A12 falls within the target range and is confirmed as the range of the segmented region A12 in the Y-axis direction (OP39 in FIG. 13). Conversely, since the segmented region B11 illustrated in FIG. 14B is the entire segmented region assigned to the wavelengths λ11-20, the reflected light optical power level of the segmented region B11 does not fall within the target range and the change to the segmented region B11 is erased (OP39 and OP40 in FIG. 13). Next, the change amount of the segmented region B11 is set to half of the amount of the previous change (half the difference).

FIG. 14C is an example of the mirror assignment for the channels of the wavelengths λ1-40 when the change amount of the segmented region B11 is halved when the reflected light optical power level is outside of the target range. In the segmented region B11, the assignment of a region that is half of the region assigned to the wavelengths λ11-20 corresponding to the change amount that is half of the previous change is changed from output port 101 to output port 102. Since the segmented region B11 after the change is one of the segmented portions of the segmented region assigned to the wavelengths λ11-20 and segmented in two in the Y-axis direction, the reflected light optical power level of the segmented region B11 falls within the target range and is confirmed as the range of the segmented region B11 in the Y-axis direction (OP39 in FIG. 13).

In the third embodiment, the segmented regions assigned to the channels are segmented in the Y-axis direction only by the number of transmission destinations, and the Y-axis direction ranges of the segmented regions are temporarily determined by assigning the segmented regions created by the segmenting to the respective transmission destinations. Next, in order to maintain the optical power levels between the channels transmitted from the output ports within the target range, the monitor values of the optical power levels of the channels transmitted from the output ports are used as reference to correct the mirror ranges of the segmented regions in the Y-axis direction. In the first embodiment as illustrated in FIG. 8, segmented regions that are not used are present even among any of the segmented regions assigned to the channels with the wavelengths λ1-40. Conversely, in the third embodiment as illustrated in FIG. 10B, a segmented region that is not used is only one portion of the segmented region assigned to the channels with the wavelengths λ11-20, and all of the segmented regions are used for the channels with the wavelengths λ1-10 and λ21-40. Therefore in the third embodiment, the number of mirrors not being used (mirrors set for a large loss) is smaller than that of the first embodiment, and thus the usage efficiency of the mirror array 114 may be improved.

In the third embodiment, the mirror ranges of the segmented regions in the Y-axis direction are corrected while using the monitor values of the optical power levels of the channels transmitted from the output ports as feedback. As a result, the reflected light optical power levels of the segmented regions may be maintained within the target range with improved accuracy.

Fourth Embodiment

In the fourth embodiment, the WDM transmission device monitors the optical power levels of the optical signals transmitted from the output ports and changes the level of optical amplification of the input optical signals in an optical amplifier 51-1 connected to the WDM transmission device at the preliminary stage when the optical power level is outside of the target range. Explanations in the fourth embodiment that duplicate explanations in the first embodiment will be omitted.

Figure 15:
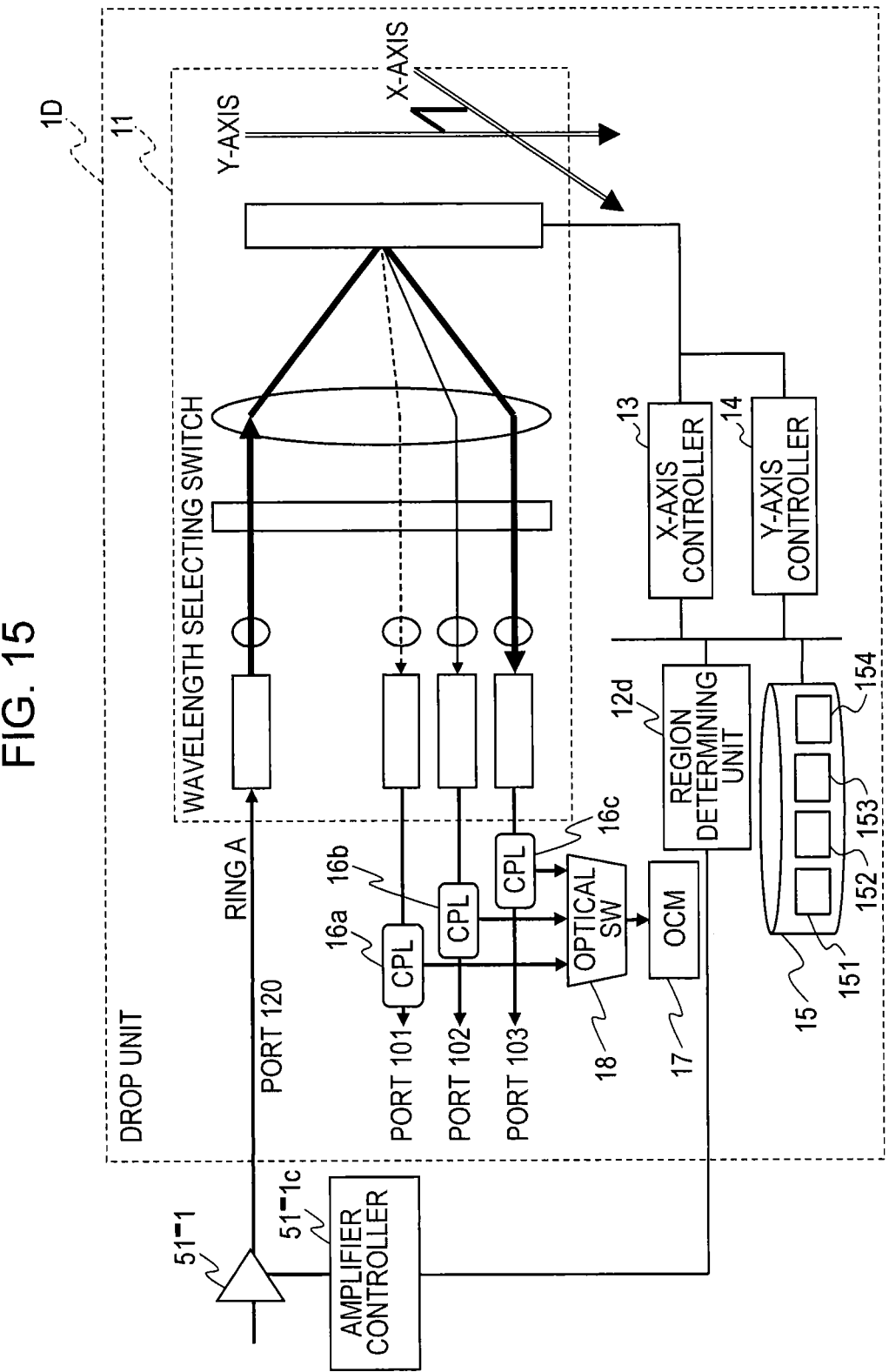
FIG. 15 is an example of a configuration of drop unit of a WDM transmission device according to a fourth embodiment.

FIG. 15 is an example of a configuration of drop unit 1D of the WDM transmission device 50 according to the fourth embodiment. A drop unit 1D of the WDM transmission device 50 includes the WSS 11, a region determining unit 12d, the X-axis controller 13, the Y-axis controller 14, the database 15, the optical couplers 16, the OCM 17, and the optical switch 18.

Optical signals outputted from output optical systems 111b of the WSS 11 are branched by the optic couplers 16 connected to the output optical systems 111b, pass through the optical switch 18, and then are inputted into the OCM 17. The optical switch 18 performs switching of the branched light from the output ports 101 to 103 to input light that is inputted into the OCM 17. The OCM 17 monitors the optical power levels and the wavelengths within the signal band of the channels included in the input light from the optical switch 18. A monitoring unit according to the embodiments is, for example, the OCM 17.

An optical amplifier 51-1 is connected to the input optical system 111a of the WSS 11, and optical signals amplified by the optical amplifier 51-1 are inputted into the input optical system 111a.

The optical amplifier 51-1 includes an amplifier controller 51-1c. The amplifier controller 51-1c controls the amplification levels of the optical amplifier. The amplifier controller 51-1c and the region determining unit 12d of the drop unit 1D of the WDM transmission device are able to communicate with each other through, for example, a backboard interface on a shelf.

The region determining unit 12d determines ranges of mirrors in the X-axis and Y-axis directions of the segmented regions assigned to the channels in the same way as in the first embodiment. The region determining unit 12d then obtains monitor values of the reflected light optical power levels of the channels from the OCM 17 for each output port, and checks whether or not the reflected light optical power levels of the channels are within a target range. If the monitor values of the outputted reflected light optical power levels of the channels for each output port are below a lower limit threshold of the target range, the region determining unit 12d requests the amplifier controller 51-1c of the optical amplifier 51-1 to change the amplification level such that the values of monitor values of the reflected light optical power levels of the channels fall within the target range. Details of the processing conducted by the region determining unit 12d are described below with reference to FIG. 17.

FIG. 16 is an example of amplification level change information 154 recorded in the database 15. In the fourth embodiment, the database 15 includes the amplification level change information 154 in addition to the X-axis assignment information 151, the Y-axis assignment information 152, and the optical power level limit information 153. The amplification level change information 154 is information of amplification level changes of the input signals set by the optical amplifier 15-1 according to the number of output ports. The region determining unit 12d obtains the changes in the amplification level of the input optical signals according to the number of output ports by reading the amplification level change information 154.

Figure 17:
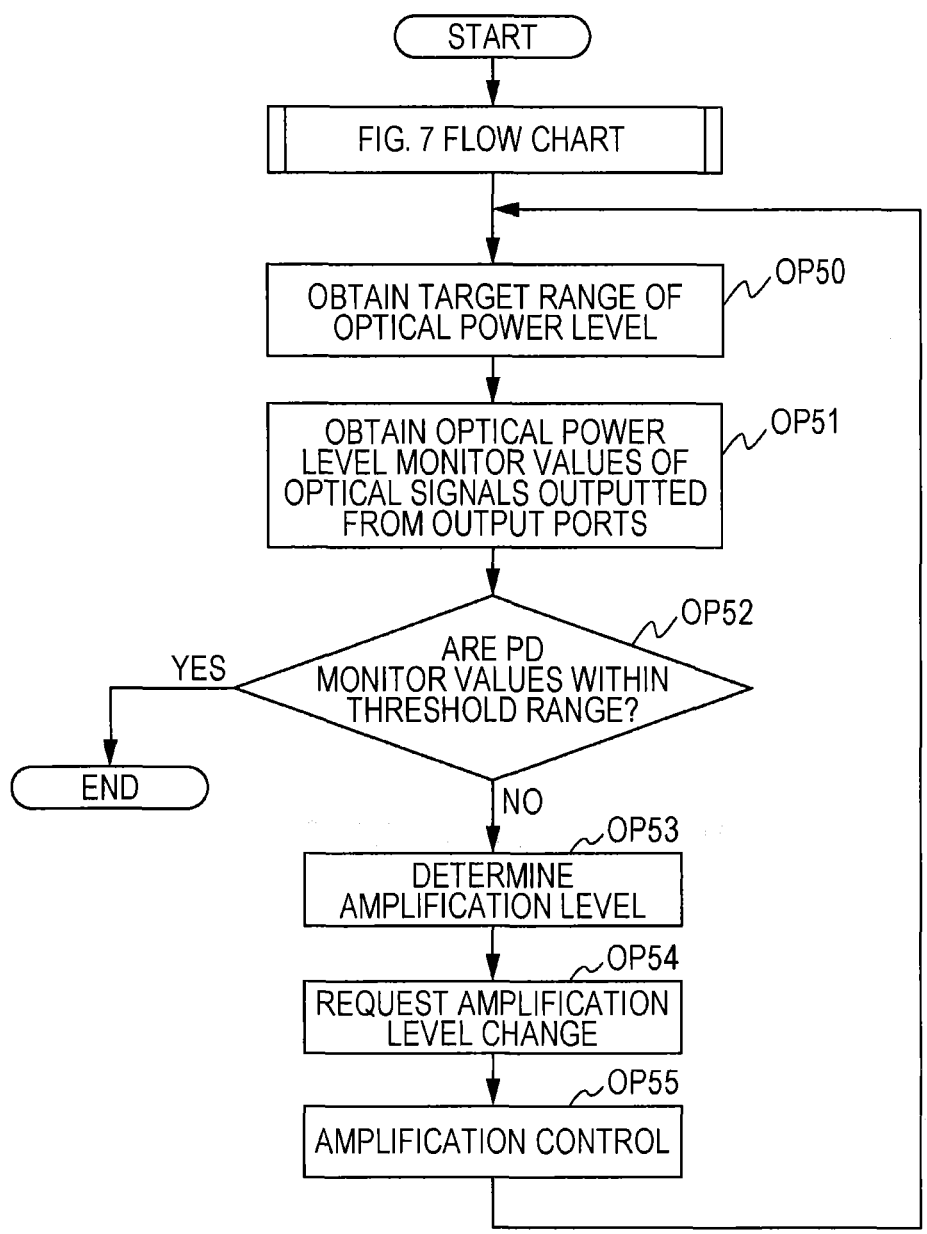
FIG. 17 is a flow chart of mirror control processing of a mirror array according to the fourth embodiment.
Figure 18:
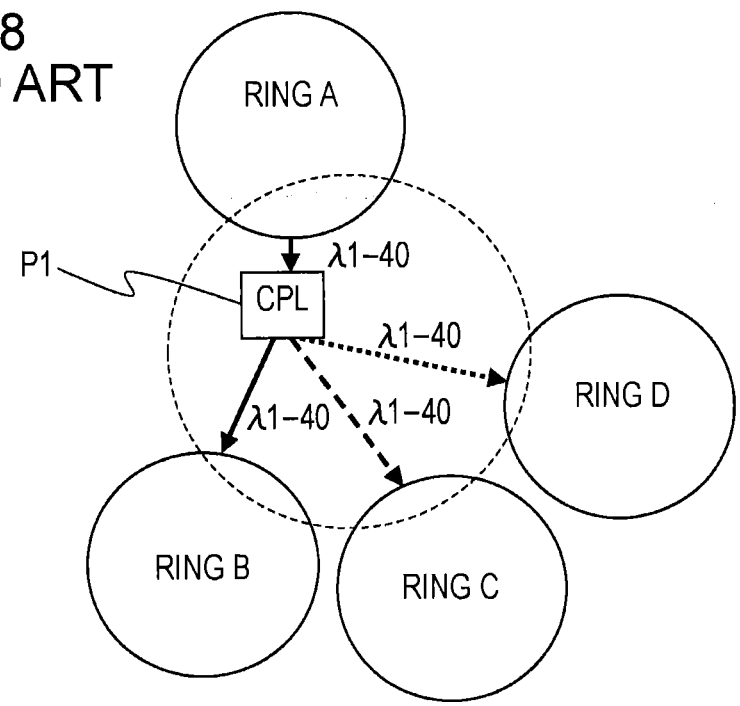
FIG. 18 illustrates an example of optical signal broadcasting with the optical switch to connect a plurality of WDM rings.
Figure 19:
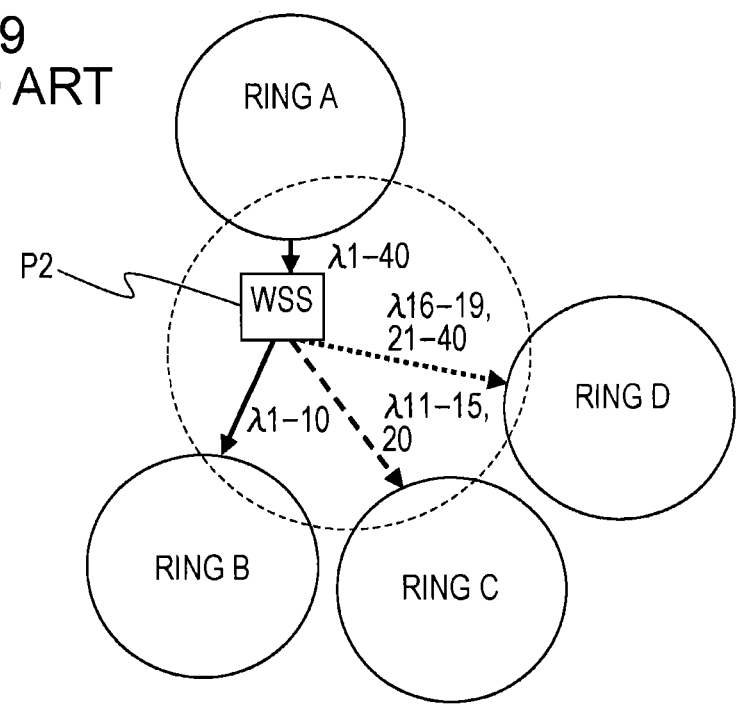
FIG. 19 illustrates an example of optical signal unicasting with an optical switch to connect a plurality of WDM rings.
Figure 20:
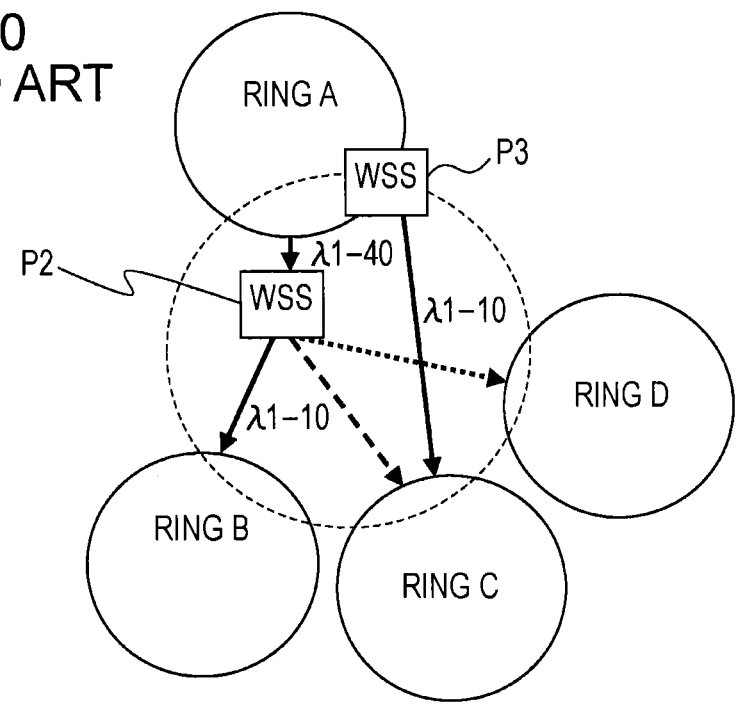
FIG. 20 illustrates a configuration example when the optical signals with wavelengths λ1-10 are transmitted to the ring B and the ring C in the optical network illustrated in FIG. 19.
Figure 21:
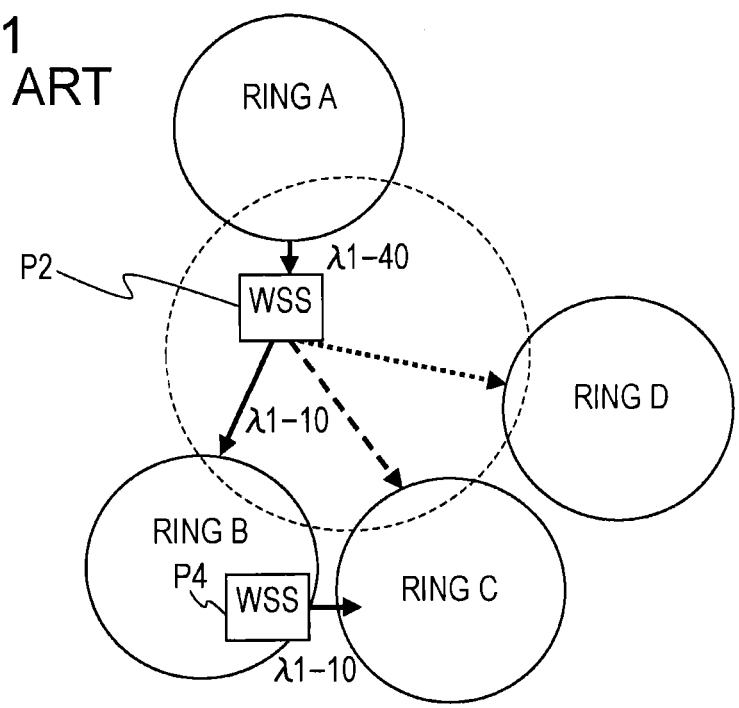
FIG. 21 illustrates a configuration example when the optical signals with wavelengths λ1-10 are transmitted to the ring B and the ring C in the optical network illustrated in FIG. 19.

FIG. 17 is a flow chart of mirror control processing of the mirror array 114 according to the fourth embodiment. The flow chart illustrated in FIG. 17 begins with the addition and updating of the provisioning information due to the setting of or changes to the optical network 100 configuration conducted by, for example, an administrator. The flow chart illustrated in FIG. 17 includes the flow of the mirror control processing (FIG. 7) of the first embodiment. Herein, processing after the mirror control processing (FIG. 7) of the first embodiment is completed will be explained.

In OP50, the region determining unit 12d obtains a target range of optical signals of the channels transmitted from target ports. In the fourth embodiment, the number of segmented regions included in the Y-axis direction is the same as the number of output ports in the same way as described in the first embodiment. Therefore, the region determining unit 12d reads the target range corresponding to the number of output ports from the optical power level limit information 153. Then the processing advances to OP51.

In OP51, the region determining unit 12d obtains the monitor values of the optical signal optical power levels of the channels transmitted from the target ports. Then the processing advances to OP52.

In OP52, the region determining unit 12d judges whether or not the monitor values of the optical power levels of the optical signals of the channels transmitted from the target ports are within the target range obtained in OP50. If the monitor values of the optical power levels of the optical signals of the channels transmitted from the target ports are within the target range obtained in OP50 (OP52: Yes), the flow chart illustrated in FIG. 17 is completed. If a monitor value of the optical power levels of the optical signals of at least one channel among the optical signals of the channels transmitted from the target ports is not within the target range obtained in OP50 (OP52: No), the processing advances to OP53. If the monitor level of the optical signal optical power level in OP52 is outside of the target range, that monitor value is a value smaller than the lower limit of the target range. This is because since the optical signals outputted from the output ports are not amplified without amplification from an amplifier and the like even if there is attenuation, the power level of the optical signals will not become larger than the upper limit of the target range.

In OP53, the region determining unit 12d obtains a change amount of an amplification level corresponding to the number of output ports from the amplification level change information 154. Then the processing advances to OP54.

In OP54, the region determining unit 12d requests the amplifier controller 51-1c of the optical amplifier 51-1 to change the amplification level only by the amplification level change amount portion obtained in OP53. Then the processing advances to OP55.

In OP55, the amplification level is changed by the amplifier controller 51-1c of the optical amplifier 51-1 according to the request from the region determining unit 12d. After the amplification level change is completed, the region determining unit 12d receives a reply from the amplifier controller 51-1c of the optical amplifier 51-1 indicating the completion. The processing then returns to OP51 and the processing from OP51 to OP55 is repeated until the optical signal optical power levels of the channels transmitted from the target ports fall within the target range.

In the fourth embodiment, when the optical power levels of the optical signals transmitted from the output ports do not fall within the target range, the optical power levels of the optical signals transmitted from the output ports are adjusted by amplifying the input optical signals. For example, when the number of output ports is large and the optical power levels of the optical signals outputted from the output ports are small, there is a risk that the optical power levels may not reach optical power levels that may be received in the WDM transmission devices of the transmission destinations. In this case, the WDM transmission device of the fourth embodiment is able to guarantee the optical power levels of the transmitted optical signals by causing the amplification levels of the input optical signals to be changed by an optical amplifier in the preliminary stage based on feedback of the optical power levels of the optical signals monitored in the output ports.

Application of the techniques described in the fourth embodiment is not limited to the first embodiment. Application of the techniques described in the fourth embodiment is also applicable to the second and third embodiments. In this case, the amplification levels of the input optical signals may be determined according to the number of output ports, or the amplification levels of the input optical signals may be determined according to the largest number of segments in the Y-axis direction among the segmented regions assigned to the channels.

The WDM transmission device (optical transmission device) in the above embodiments may include an optical transmission program that causes a computer including a processor to function as an information processor apparatus, and a computer-readable recording medium in which is recorded the optical transmission program. The recording medium that is readable by a computer and the like may store data and programs and other information by electric, magnetic, optical, mechanical or chemical effect to allow the recording medium to be read by a computer and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission device comprising:
a spectral element configured to disperse an incident light beam in a first direction according to a plurality of wavelengths of the incident light beam;
a mirror array configured by a plurality of mirrors, each mirror having a reflective surface in which a reflection angle is adjustable and to which the dispersed incident light beam in the first direction is incident, the reflective surface being arranged on a plane formed by the first direction and a second direction orthogonal to the first direction;
a plurality of ports arranged in the second direction;
a region determining unit configured to
determine, based on a wavelength band of the incident light beam, a first direction range of the first direction in which the dispersed incident light beam is reflected by the mirror array,
determine, based on a port according to the wavelength band of the incident light beam, a second direction range of the second direction in which the dispersed incident light beam is reflected by the mirror array,
determine a plurality of mirror groups formed by a plurality of mirrors reflecting the incident light beam of the wavelength band according to whether the port is coupled with a network of a transmission destination; and
a controller configured to adjust the reflection angle, so that a light beam reflected at the reflective surface is outputted to more than one port of the plurality of ports according to a region segmented in the second direction in the mirror array, the light beam having a wavelength band being incident to the reflective surface, wherein
the region determining unit
performs control such that a light beam power of at least one wavelength band of a light beam outputted to the port falls within a specified power range;
determines the second direction range of respective mirror groups, so that the power of the light beam reflected at mirrors included in a respective mirror group falls within the specified power range,
determines the mirrors included in the respective mirror group are to be active when the port is coupled with the network, and
determines the mirrors included in the respective mirror group are to be non-active when the port is not coupled with the network; and
the controller
adjusts the reflection angle of the reflective surface of the mirrors included in the respective mirror group determined to be active, so that the light beam reflected at the reflective surface is outputted to the port, and
adjusts the reflection angle of the reflective surface of the mirrors included in the respective mirror group determined to be non-active, so that the light beam reflected at the reflective surface has large loss.

* * * * *